(12) United States Patent
Fujimori

(10) Patent No.: US 6,359,721 B1
(45) Date of Patent: Mar. 19, 2002

(54) OPTICAL MODULATION DEVICE AND PROJECTION DISPLAY DEVICE UTILIZING THE OPTICAL MODULATION DEVICE

(75) Inventor: Motoyuki Fujimori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/386,372

(22) Filed: Aug. 31, 1999

(30) Foreign Application Priority Data

Sep. 9, 1998 (JP) ............................................ 10-255844

(51) Int. Cl.[7] ................................................. G02F 1/03
(52) U.S. Cl. ........................ 359/246; 359/249; 359/259; 349/8
(58) Field of Search ................................. 359/237, 248, 359/245, 246, 249, 259; 349/5, 8, 9, 161, FOR 124, FOR 125

(56) References Cited

U.S. PATENT DOCUMENTS

| | | | |
|---|---|---|---|
| 4,842,376 A | * 6/1989 | Braatz et al. | 349/28 |
| 5,654,782 A | * 8/1997 | Morokawa et al. | 349/143 |
| 5,978,136 A | * 11/1999 | Ogawa et al. | 359/487 |
| 6,000,802 A | * 11/1999 | Hashizume et al. | 353/38 |

* cited by examiner

Primary Examiner—Huy Mai
(74) Attorney, Agent, or Firm—Oliff & Berridge, PLC

(57) ABSTRACT

An optical modulation device which can facilitate a reduction in size of a device and prevent overheating of the optical modulation device, and a projection display device utilizing the optical modulation device are provided. In the optical modulation device, sapphire glasses are affixed to the light-incident side and the light-emitting side surfaces of liquid crystal panels which respectively modulates light of three colors of red, green, and blue emitted from a light source according to image information. Therefore, heat generated on optical modulation devices can be discharged, so that overheating of the optical modulation devices can be prevented, and a reduction in size can be achieved. In addition, since the sapphire glass is difficult to scratch, it becomes easy-to-handle, thereby facilitating the management of the optical modulation devices.

35 Claims, 15 Drawing Sheets

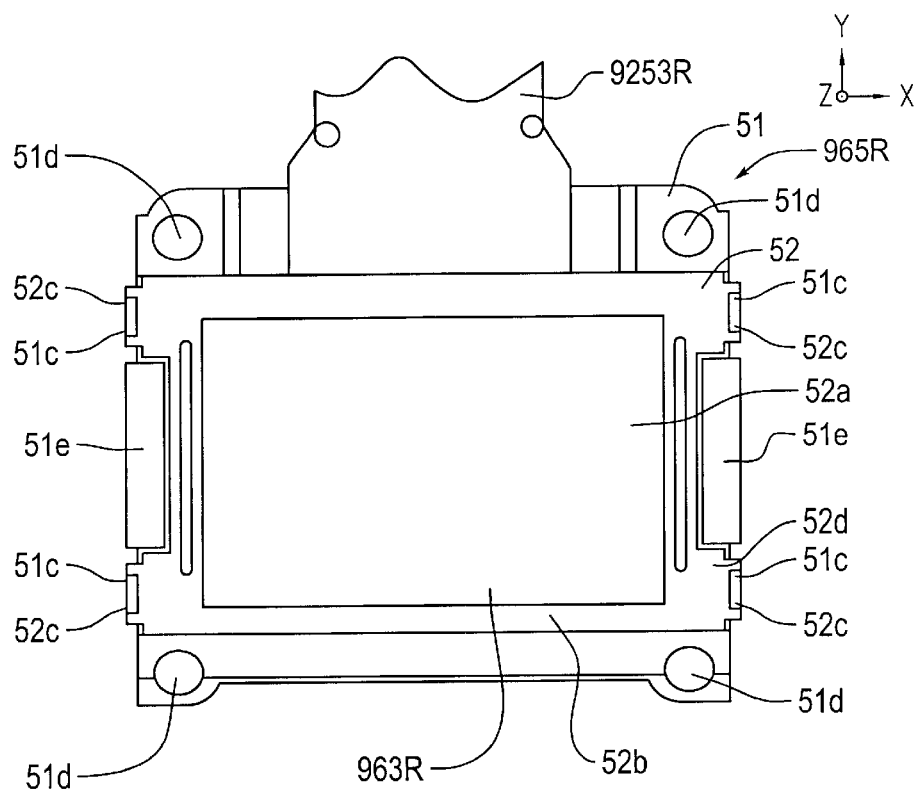
Fig. 11
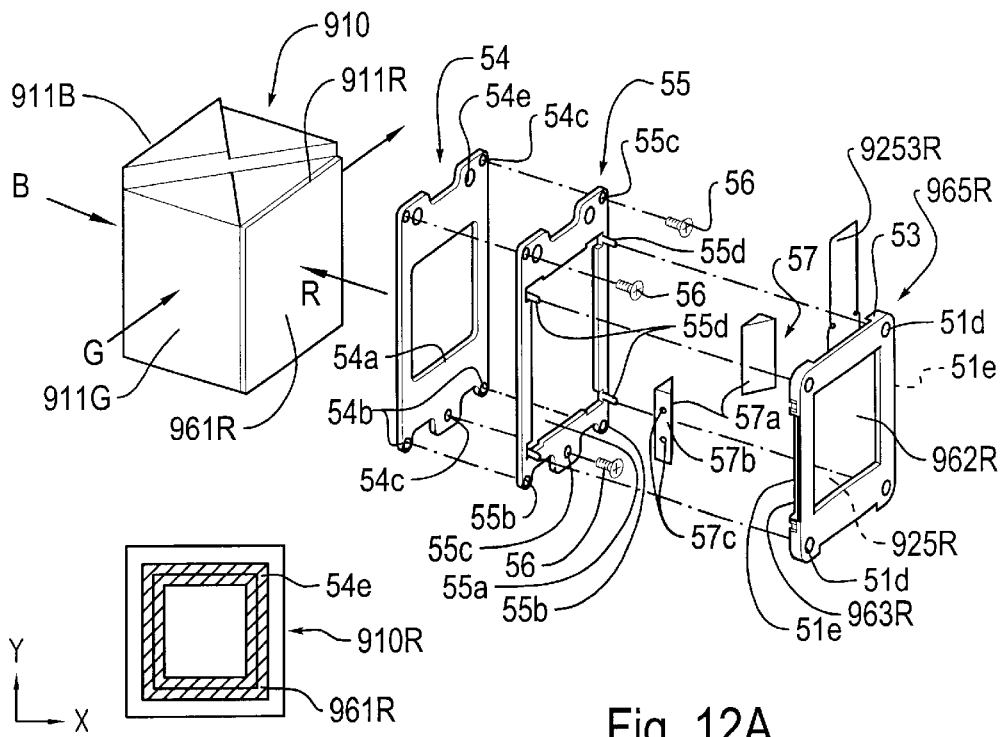
Fig. 12A
Fig. 12B

OPTICAL MODULATION DEVICE AND PROJECTION DISPLAY DEVICE UTILIZING THE OPTICAL MODULATION DEVICE

BACKGROUND OF THE INVENTION

1. Field of Invention

The present invention relates to an optical modulation device and a projection display device utilizing the optical modulation device, and more particularly, to a technique for achieving a reduction in size and for efficiently cooling an optical system including the optical modulation device arranged inside the device.

2. Description of Related Art

Hitherto, a projection display device has been known which includes a light source lamp, an optical system for optically processing light emitted from the light source lamp so as to form an optical image according to image information, a projection lens for enlarging and projecting the image formed by the optical system onto a projection plane, and a power supply for supplying electric power for driving the device. In such a projection display device, the optical system usually includes a color separation optical system for separating light from the light source lamp into three colors, optical modulation devices for respectively modulating the separated three color light, and a prism unit for synthesizing the modulated light. In addition, the optical modulation devices are arranged on a head member of high rigidity inside the device so that the images formed by three optical modulation devices are not be projected offset from one another.

In addition, such a projection display device is widely utilized in multimedia presentations at conferences, academic meetings, exhibitions, and the like.

Incidentally, the projection display device may be kept installed in a conference room, or the like for a presentation, but may be brought in the meeting room as necessary, or stored in another place after the presentation. Therefore, it is necessary to improve portability in order to facilitate transportation of the device, and a further reduction in size is demanded. On the other hand, however, a light source tends to be intensified in order to secure luminance of a projected image.

However, a reduction in size of the device allows various types of components to be densely arranged in the device, and it is difficult to circulate cooling air drawn ill by a fan or the like. In addition, since the optical modulation devices are easily affected by heat, it becomes important to effectively cool heat-generating components, and to prevent the optical modulation devices from storing heat.

SUMMARY OF THE INVENTION

It is an object of the present invention to provide an optical modulation device which can facilitate a reduction in size of the device and achieve the prevention of overheating of the device, and to provide a projection display device utilizing the optical modulation device.

An optical modulation device of the present invention may consist of an electro-optical device for modulating light emitted from a light source according to image information, wherein a sapphire glass is affixed to at least one surface of the light-incident side and the light-emitting side of the light of the electro-optical device.

Further, the optical modulation device of the present invention may consist of an electro-optical device for modulating light emitted from a light source according to image information, wherein the electro-optic device has a pair of substrates, and at least one of the substrates is made of sapphire glass having a thickness of not less than 1.5 mm, and not more than 3 mm.

A comparison of characteristics of the sapphire glass and characteristics of other glasses is given in Table 1.

TABLE 1

| | Characteristic Data | | | |
| --- | --- | --- | --- | --- |
| | Sapphire | quartz glass | BK7 | Float glass (Blue plate) |
| Young's modulus (Mpa) | 4.7 × 10E5 | 7.3 × 10E4 | 7.2 × 10E4 | 7.2 × 10E4 |
| Thermal conductivity (W/m · K) | 42.0 | 1.2 | 1.0 | 0.8 |
| Vickers hardness | 2300 | 900 | 570 | 548 |
| Refractive index at 589 nm | No = 1.768 Ne = 1.760 | Nd = 1.459 | Nd = 1.517 | Nd = 1.52 |

As will be understood from Table 1, the thermal conductivity of the sapphire glass is extremely high. Therefore, according to the present invention, the heat-dissipating property of the optical modulation device is improved, and overheating can be prevented. In addition, this enables the use of a light source having higher luminance. Further, since the light from the light source can be collected on the optical modulation device having a smaller area, the optical modulation device can be reduced in size.

Further, by affixing a sapphire glass to the electro-optical device, dust can be prevented from being attached to the electro-optical device.

In addition, since the sapphire glass is hard because of high Young's modulus, and is difficult to scratch, yield thereof is improved and it becomes easy-to-handle, thereby facilitating management.

In addition, in the case where the optical modulation device of the present invention is used in the projection display device, when the sapphire glass is affixed to the light-emitting surface of the electro-optical device, by increasing the thickness of thereof larger than the focal depth of the projection lens, or when the substrate is made of sapphire glass, by setting the thickness thereof to not less than 1.5 mm, and not more than 3 mm, dust or the like attached to the surface thereof can be made inconspicuous on the projection screen. Here, since the sapphire glass has a high refractive index as shown in Table 1, in the case where the sapphire glass is used for such a purpose, sapphire glass thinner than other glasses can be used.

Further, in the electro-optical device having pixels formed in a matrix, and the periphery of the pixels is light-shielded, a micro lens array may be provided on the light-incident surface. The micro lens array is intended for improving the use efficiency of light by collecting light to a portion (opening) where the pixels are not shielded so that the incident light is not shielded by a light-shielding section. In the present invention, when the sapphire glass is affixed to the light-incident surface of the electro-optical device, or when the substrate of the electro-optical device on the light-incident side is made of sapphire glass, the sapphire glass may be used as the micro lens array. As will be understood from Table 1, since the sapphire glass has an extremely high refractive index, a sufficient light-collecting power can be obtained even without reducing a radius of curvature of the micro lens. Therefore, the micro lens can be accurately formed, thereby making it possible to more effectively achieve improvement in the use efficiency of light. Further, in the case where the optical modulation device provided with the micro lens array is used in the projection display device, even if light having a large angle of incidence enters the optical modulation device, the use of the sapphire glass as the micro lens array allows the light to be corrected to light having a smaller angle of incidence. Therefore, the amount of light taken by the projection lens can be increased, thereby making it possible to obtain a bright projection image.

In the optical modulation device of the present invention, the sapphire glass may be preferably affixed to the surface of the light-incident side of the electro-optical device. Alternatively, the substrate on the light-incident side of the electro-optical device may be preferably made of sapphire glass because, as described above, the sapphire glass can be used as the micro lens array in this case. In addition, in the case where the optical modulation device of the present invention is adopted to the projection display device using the cross-dichroic prism, as in the embodiments of the present invention to be described later, since the light-incident side has more spaces and provides higher heat-dissipating effect than the light-emitting side, overheating of the optical modulation device can be prevented more efficiently.

The optical modulation device of the present invention may preferably include a frame for holding the electro-optical device, and a metal thin-film may be preferably provided on a contact portion between the frame and the sapphire glass. In this case, since heat is transmitted to the frame via the metal thin-film, heat-dissipating property is further improved, and the overheating of the optical modulation device can be prevented more efficiently.

In addition, the frame may be constructed to have two frames for holding the electro-optical device from the side of the light-incident surface and the side of the light-emitting surface. In this case, at least one of the frames may be preferably formed of a material including magnesium having excellent thermal conductivity and heat-dissipating property as a principal material. In addition, heat-dissipating fins may be preferably provided on the frame, and the fins may be preferably provided along the flow of cooling air for cooling the electro-optical device and the vicinity thereof. This allows heat to be discharged from the frame more excellently, thereby preventing overheating of the optical modulation device more efficiently.

In the optical modulation device of the present invention, a graphite sheet for transmitting heat from the frame to another part may be provided on the frame. In this case, the graphite sheet may be connected to a metallic part. Since the graphite sheet has good thermal conductivity, heat from the optical modulation device can be transmitted to other parts. In particular, by bringing it into contact with the metallic part, the overheating of the optical modulation device can be prevented more efficiently.

Further, in the optical modulation device of the present invention, when polarizers are arranged on the light-incident side and light-emitting side of the electro-optical device, at least one of the polarizers may preferably be arranged at a position apart from the electro-optical device or the sapphire glass. This can prevent the heat generated on the polarizers from being transmitted to the electro-optical device and the sapphire glass.

The projection display device of the present invention may consist of three optical modulation devices for respectively modulating red, green, and blue light according to image information, wherein the optical modulation devices have an electro-optical device, and wherein a sapphire glass is affixed to at least one surface of the light-incident side and the light-emitting side of the light of the electro-optical device in the optical modulation device for modulating at least blue light.

In addition, the projection display of the present invention may consist of three optical modulation devices for respectively modulating red, green, and blue light according to image information, wherein the optical modulation devices have an electro-optical device, wherein the electro-optical device has a pair of substrates, and wherein at least one of the substrates of the electro-optical device in the optical modulation device for modulating at least blue light is made of sapphire glass having a thickness of not less than 1.5 mm, and not more than 3 mm.

As will be understood from Table 1 give above, the thermal conductivity of the sapphire glass is extremely high. Therefore, if the sapphire glass is affixed to the electro-optical device, or if at least one of a pair of substrates of the electro-optical device is made of sapphire glass, heat-dissipating property of the optical modulation device is improved, and overheating can be prevented. Thus, of the optical members constituting the projection display device, the electro-optical device particularly having poor heat resistance is easily cooled, and reliability of the device is improved. Here, the above-described configuration can be applied to all of the optical modulation devices for the three colors. However, only by applying blue light having the highest energy to the optical modulation device that modulates and by the optical modulation device being easily deteriorated thereby, the effect of improvement of reliability of the device can be expected. In addition, the configuration may be mounted to only the optical modulation device modulating any two colors. In this case, the configuration may be applied to the optical modulation devices that modulate blue and green colors having relatively high energy.

In addition, since the electro-optical device can be easily cooled, a light source having higher luminance can be used, and a projection display device of a bright image can be obtained. Further, since the light from the light source can be collected on the optical modulation device having a smaller area, the device can be reduced in size.

In addition, the sapphire glass is hard because of high Young's modulus, and is difficult to be scratched. Therefore, deterioration in image quality due to projection of scratch on the projected image can be prevented.

Further, by affixing the sapphire glass on the light-emitting surface of the electro-optical device to increase the thickness thereof to larger than the focal depth of the projection lens, or by making at least one of a pair of substrates of the electro-optical device of sapphire glass having a thickness of not less than 1.5 mm, and not more than 3 mm, dust or the like attached to the surface thereof can be made inconspicuous on the projection screen. Here, since the sapphire glass has a high refractive index as shown in Table 1, in the case where the sapphire glass is used for such a purpose, sapphire glass thinner than other glasses can be used. Thus, the heat from the electro-optical device is discharged to the outside with extreme efficiency as compared with other glasses.

Further, as described above, when the sapphire glass forming the micro lens array is affixed to the light-incident surface of the electro-optical device, or when the substrate on the light-incident side is made of sapphire glass, even if light having a large angle of incidence enters the optical modulation device, it can be corrected to light having a smaller angle of incidence. Therefore, the amount of light taken by the projection lens can be increased, thereby making it possible to obtain a bright projection image.

In the projection display device of the present invention, the sapphire glass may be preferably affixed to the surface of the light-incident side of the electro-optical device. In addition, when the substrate is made of sapphire glass, the substrate on the light-incident side may be preferably made of sapphire glass because the sapphire glass can be used as the micro lens array in this case. In addition, in a projection display device using the cross-dichroic prism, as in the embodiments of the present invention to be described later, since the light-incident side has more spaces and provides higher heat-dissipating effect than the light-emitting side, cooling of the optical modulation device can be further facilitated.

The projection device of the present invention may preferably include a frame for holding the electro-optical device, and a metal thin-film may preferably be provided on a contact portion between the frame and the sapphire glass. In this case, since heat is transmitted to the frame via the metal thin-film, cooling efficiency of the optical modulation device can be further improved, thereby further contributing reliability of the device.

In addition, the frame may be constructed to have two frames for holding the electro-optical device from the side of the light-incident surface and the side of the light-emitting surface. In this case, at least one of the frames may preferably be formed of a material including magnesium having excellent thermal conductivity and heat-dissipating property as a principal material. In addition, heat-dissipating fins may be preferably provided on the frame, and the fins may be preferably provided along the flow of cooling air for cooling the electro-optical device and the vicinity thereof. This allows cooling efficiency of the optical modulation device to be improved more efficiently, thereby further improving reliability of the device.

In the projection display device of the present invention, a graphite sheet for transmitting heat from the frame to another part may be provided on the frame. In this case, the graphite sheet may be connected to a metallic part. Since the graphite sheet has good thermal conductivity, heat from the optical modulation device can be transmitted to other parts. In particular, by bringing it into contact with the metallic part, the cooling efficiency of the optical modulation device can be further improved.

Further, in the projection display device of the present invention, when polarizers are arranged on the light-incident side and the light-emitting side of the electro-optical device, at least one of the polarizers may be preferably arranged at a position apart from the electro-optical device or the sapphire glass. This can prevent the heat generated on the polarizers from being transmitted to the electro-optical device and the sapphire glass, thereby further improving the cooling efficiency of the optical modulation device.

BRIEF DESCRIPTION OF THE DRAWINGS

FIG. 11 illustrates a schematic plane configuration of the frame of the optical modulation device of the embodiment, as viewed from the light-emitting side.

FIG. 12(A) is an exploded perspective view showing a state in which the frame of the optical modulation device of the embodiment is mounted to a light-incident surface of a light-synthesizing prism, and FIG. 12(B) is an explanatory view showing the size of a fixed frame plate and a polarizer.

DETAILED DESCRIPTION OF PREFERRED EMBODIMENTS

Embodiments of the present invention will now be described with reference to the drawings.

Figure 1:
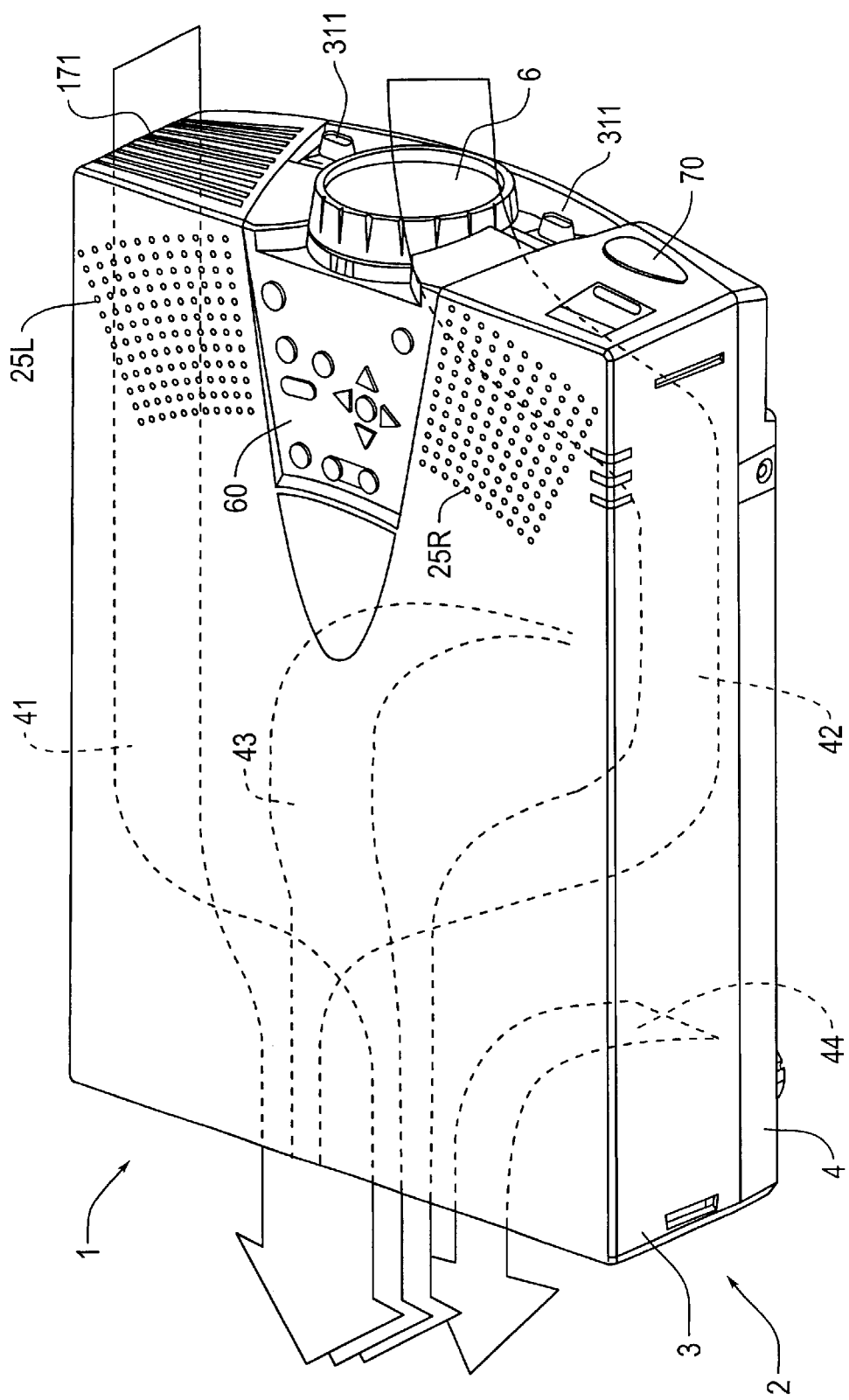
FIG. 1 is an outward perspective view of a projection display device according to an embodiment of the present invention, as viewed from the top side.
Figure 2:
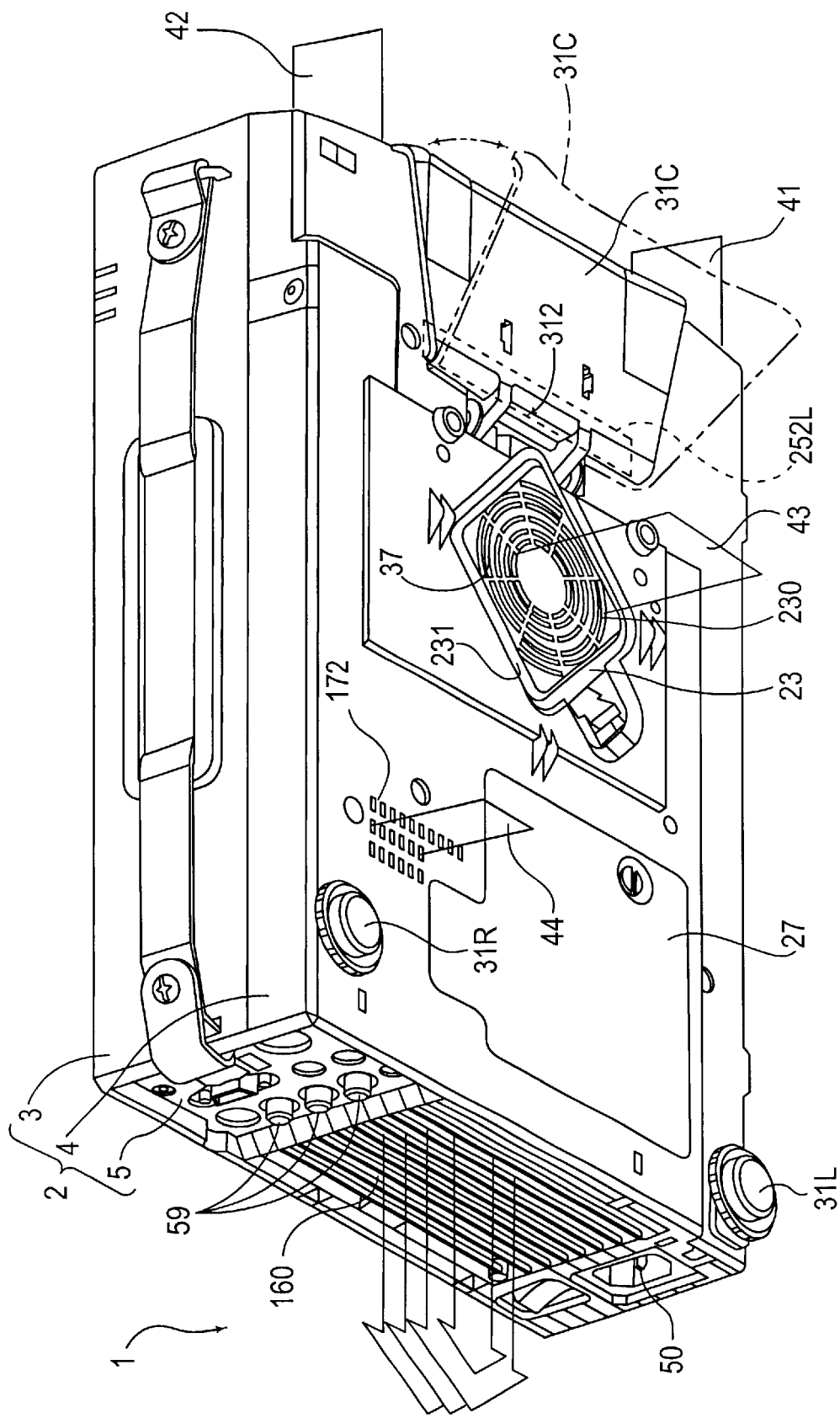
FIG. 2 is an outward perspective view of the projection display device according to the embodiment, as viewed from the bottom side.

FIGS. 1 and 2 are schematic perspective views of a projection display device 1 according to a first embodiment of the present invention. FIG. 1 is a perspective view as viewed from the top side, and FIG. 2 is a perspective view as viewed from the bottom side.

The projection display device 1 is of the type that separates light emitted from a light source lamp into light of three colors of red (R), green (G), and blue (B), modulates the light of three colors according to image information through an optical modulation device including liquid crystal panels (electro-optical devices), synthesizes the modulated light of the respective colors by a prism (color-synthesizing optical system), and enlarges and displays the synthesized light onto a projection plane via a projection lens 6. Components are accommodated in an outer casing 2 except a part of the projection lens 6.

The outer casing 2 basically consists of an upper casing 3 for covering the top surface of the device, a lower casing 4 constituting the bottom surface of the device, and a rear casing 5 (FIG. 2) for covering a rear face.

As shown in FIG. 1, many communication holes 25R and 25L are formed at the right and left ends of the front side (projection lens side) of the top face of the upper casing 3. Control switches 60 for controlling image quality of the projection display device 1 is provided between the communicating holes 25R and 25L. Further, a light-receiving section 70 is provided at the lower left portion of the front of the upper casing 3 so as to receive an optical signal from a non-illustrated remote controller.

As shown in FIG. 2, on the bottom face of the lower casing 4, a lamp-exchanging cover 27 for exchanging a light source lamp unit 8 (to be described herein below), and an air filter cover 23 having formed therein an air inlet 230 for cooling the inside of the device are provided.

In addition, the bottom face of the lower casing 4 is provided, as shown in FIG. 2, with a foot 31C at substantially the center of the front end, and feet 31R and 31L at the right and left rear corners. The foot 31C is rotated by a rear-side rotating mechanism 312 (FIG. 2) by raising levers 311 shown in FIG. 1, and is urged into an open state in which it is separated on its front side from a device main body, as shown by a double-dot chain line in FIG. 2. By controlling the amount of rotation of the foot 31C, the vertical position of display screen on the projection plane can be changed. On the other hand, the feet 3 1R and 3 1L are extended or retracted in the projecting direction by being rotated and, by controlling the amount of extension or retraction thereof, the inclination of the display screen can be changed.

An AC inlet 50 for external power supply, and various types of input-output terminals 59 are formed on the rear casing 5, as shown in FIG. 2, and an air outlet 160 for exhausting air inside the device is formed adjacent to the input-output terminals 59.

Figure 3:
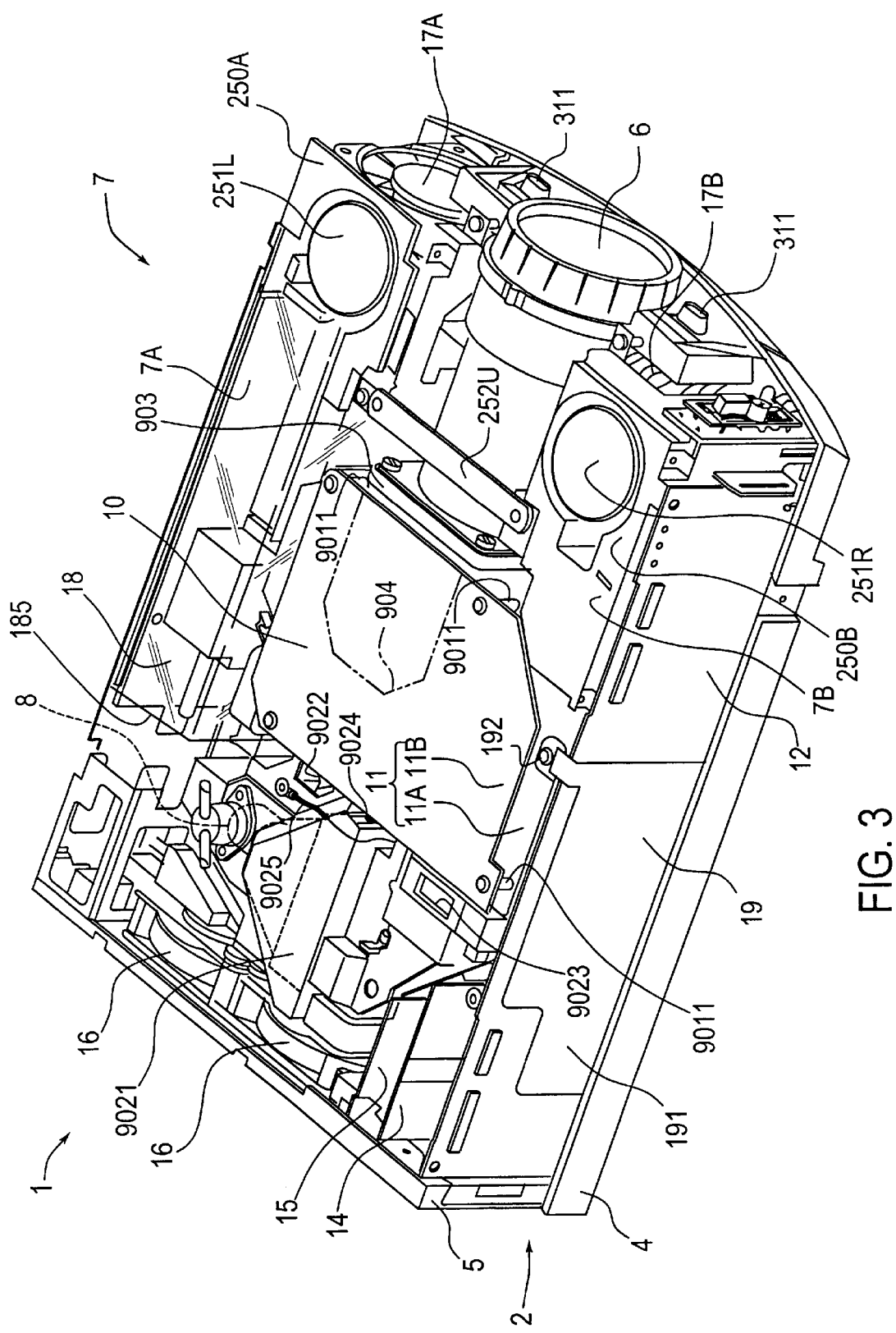
FIG. 3 is a perspective view showing the internal structure of the projection display device of the embodiment.
Figure 4:
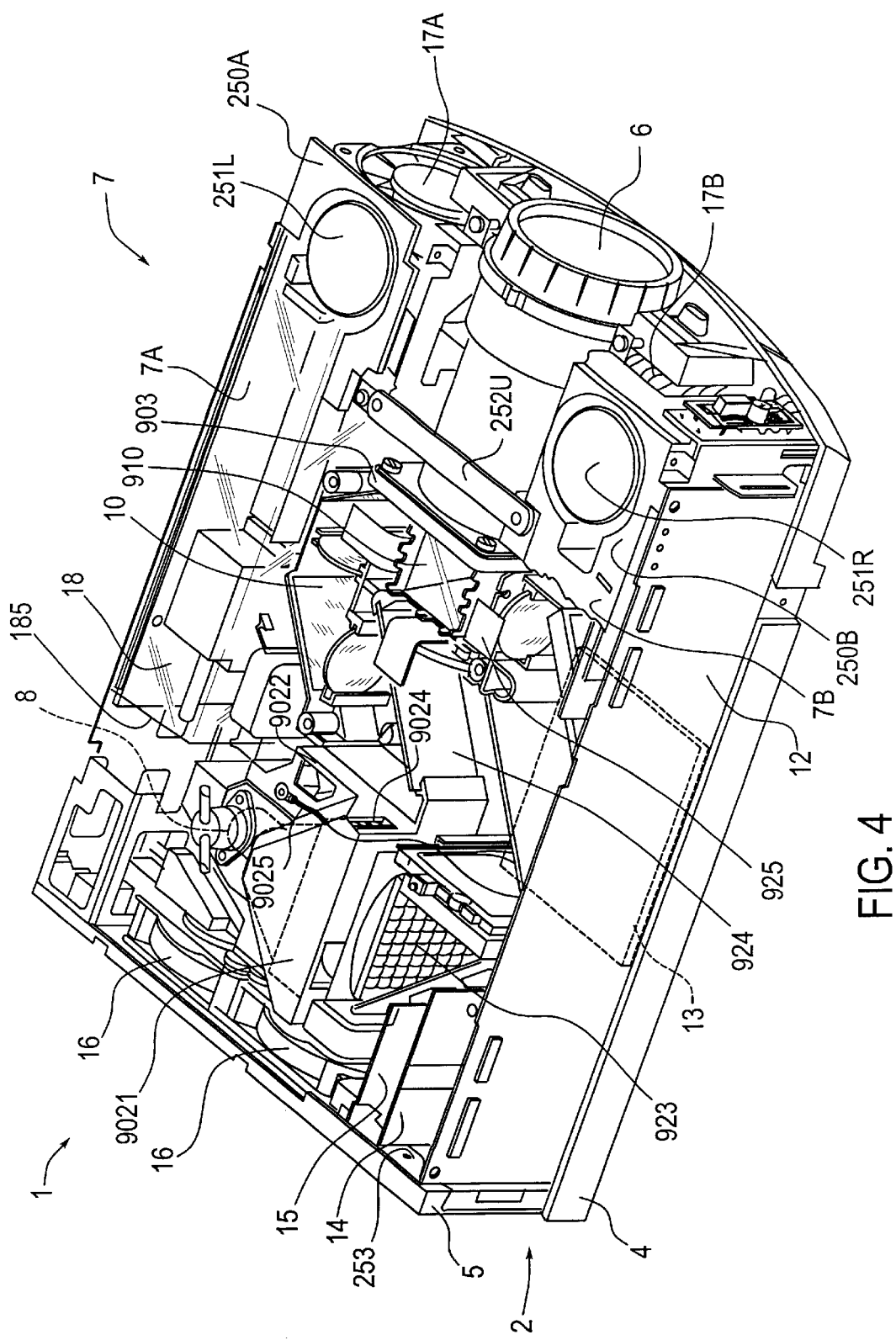
FIG. 4 is a perspective view showing an optical system inside the projection display device of the embodiment.
Figure 5:
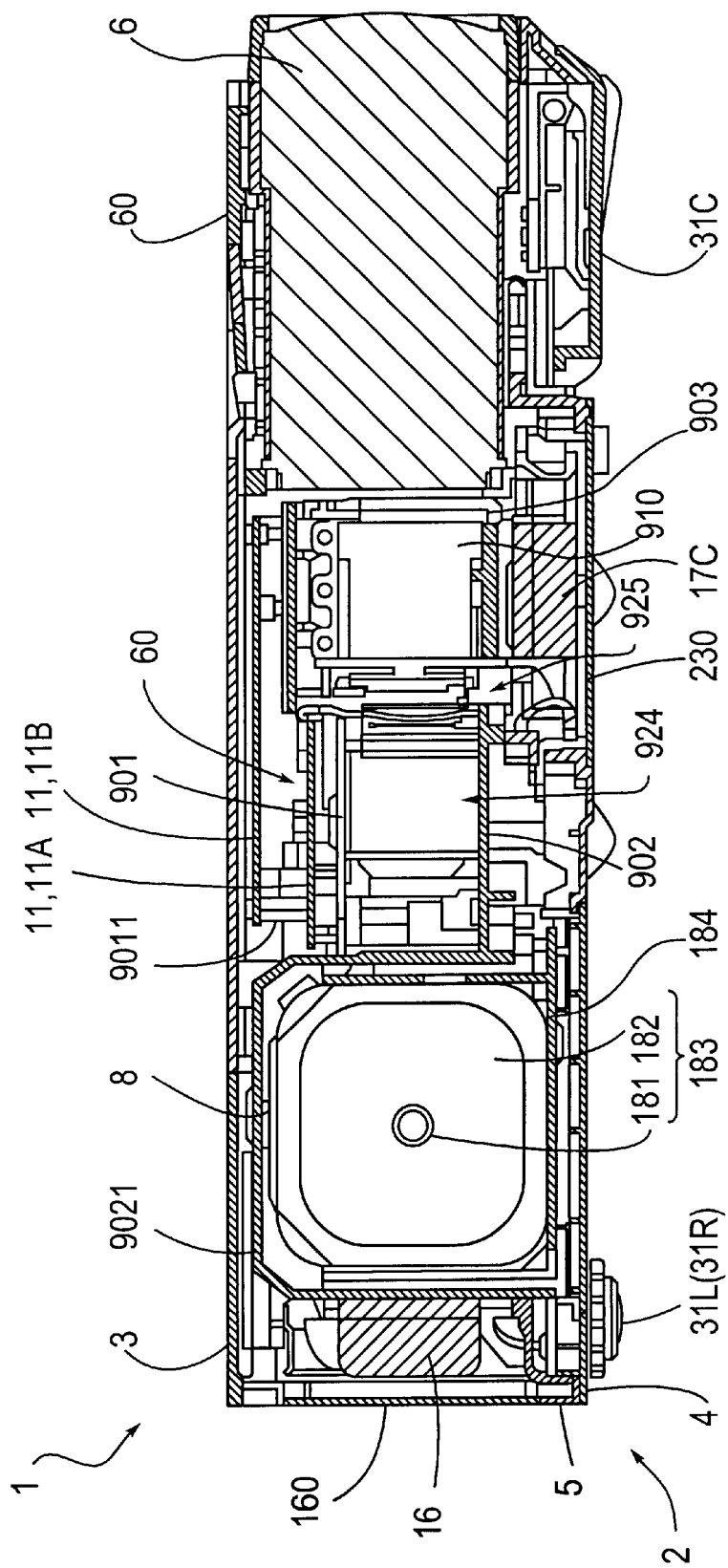
FIG. 5 is a vertical sectional view showing the internal structure of the projection display device of the embodiment.

FIGS. 3 to 5 show the internal structure of the projection display device 1.

FIGS. 3 and 4 are schematic perspective views of the inside of the device, and FIG. 5 is a vertical sectional view of the projection display device 1.

As shown in these drawings, a power-supply unit 7 serving as a power supply, the light source lamp unit 8, an optical unit 10 constituting the optical system, a pair of upper and lower driver boards 11 serving as an optical modulation device driving substrate, and a main board 12 serving as a control circuit substrate are arranged inside the outer casing 2.

The power-supply unit 7 consists of first and second power-supply blocks 7A and 7B formed on both sides of the projection lens 6. The first power-supply block A transforms electric power obtained via the AC inlet 50 to supply the power mainly to the second power-supply block 7B and the light source lamp unit 8, and includes a lamp-driving substrate 18 to be described later for driving the light source lamp 8 of the light source lamp unit 8, in addition to a power-supply circuit substrate having formed thereon a transformer, a rectifying circuit, a smoothing circuit, a voltage-regulating circuit, and the like, and the lamp driving substrate 18 is covered with a transparent resin cover 185. The second power-supply block 7B further transforms and supplies the electric power obtained from the first power-supply block 7A, and includes a power-supply circuit substrate having formed thereon various types of circuits in addition to a transformer, similarly to the first power-supply block 7A. The electric power is supplied to another power-supply circuit substrate 13 (shown by a dotted line in FIG. 4) arranged below the optical unit 10, and first and second intake fans 17A and 17B arranged adjacent to the power supply blocks 7A and 7B. In addition, the power-supply circuit formed on the power-supply circuit substrate 13 produces mainly an electric power for driving a control circuit on the main board 12 based on the electric power from the second power-supply block 7B, and produces an electric power for other low-power components. Here, the second intake fan 17B is arranged between the second power-supply block 7B and the projection lens 6 so as to draw cooling air from the outside into the inside through a clearance formed between the projection lens 6 and the upper casing 3 (FIG. 1). The respective power-supply blocks 7A and 7B include cover members 250A and 250B made of aluminum or the like, each having conductivity, and speakers 251L and 251R for voice output are provided on the respective cover members 250A and 250B at the positions corresponding to the communicating holes 25L and 25R of the upper casing 3. These cover members 250A and 250B are mechanically and electrically connected to each other at the top by a metal plate 252U having conductivity, as shown in FIG. 4, are electrically connected at the bottom by a metal plate 252L (shown by a dotted line in FIG. 2), and are finally grounded through a GND (ground) line of the inlet 50. Of these metal plates 252U and 252L, the metal plate 252L is previously fixed to the lower casing 4 made of resin, and both ends thereof are brought into contact with the lower surfaces of the cover members 250A and 250B to establish continuity therebetween by assembling the power-supply blocks 7A and 7B into the lower casing 4.

The light source lamp unit 8 constitutes a light source portion of the projection display device 1, and includes a light source device 183 consisting of a light source lamp 181 and a reflector 182, and a lamp housing 184 for accommodating therein the light source device 183. Such a light source lamp unit 8 is covered with an accommodating section 9021 that is integrally formed with a lower light guide 902 (FIG. 5) and is constructed so as to be removed from the above-mentioned lamp exchanging cover 27. A pair of exhaust fans 16 are provided on the left and right sides at the positions corresponding to the air outlet 160 of the rear casing 5 at the rear of the accommodating section 9021. As described hereinbelow in detail, cooling air drawn by the first to third intake fans 17A to 17C is introduced by the exhaust fans 16 into the accommodating section 9021 from an opening provided in the vicinity thereof, and the light source lamp unit 8 is cooled by the cooling air, and then the cooling air is exhausted from the air outlet 160. Electric power for each exhaust fan 16 is supplied from the power-supply circuit substrate 13.

The optical unit 10 is a unit for optically processing light emitted from the light source lamp unit 8 to form an optical image according to image information, and includes an illuminating optical system 923, a color separation optical system 924, an optical modulation device 925, and a prism unit 910 serving as a color synthesizing optical system. The optical elements in the optical unit 10 other than the optical modulation device 925 and the prism unit 910 are vertically held between upper and lower light guides 901 and 902. The upper and lower light guides 901 and 902 are integrally formed, and are fixed by fixing screws on the side of the lower casing 4.

Figure 6:
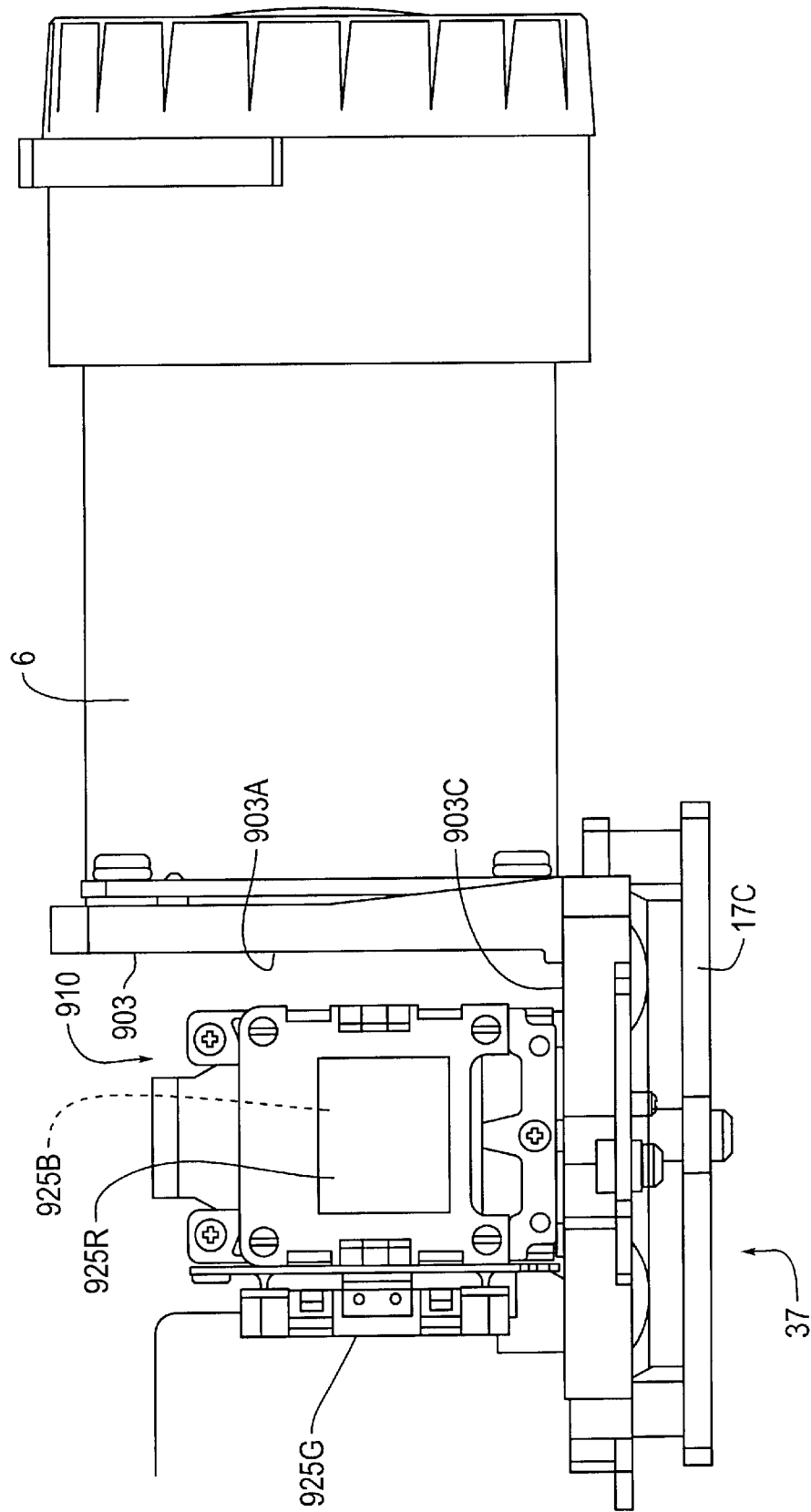
FIG. 6 is a vertical sectional view of a structure according to the embodiment in which an optical modulation devices a color synthesizing optical system, and a projection lens are mounted.

The prism unit 910 shaped like a rectangular parallelepiped is, as shown also in FIG. 6, fixed by fixing screws to a prism mounting surface 903C of a head body 903 having an almost L-shaped cross-section, and the head body 903 is formed by an integrally molded article of magnesium. In addition, liquid crystal panels 925R, 925G, and 925B serving as electro-optical devices constituting the optical modulation device are arranged to oppose three side-surfaces of the prism unit 910, and similarly fixed to the head body 903 via a fixing plate (not shown). Incidentally, the liquid crystal panel 925B is provided at the position opposed to the liquid crystal panel 925R across the prism unit 910 (FIG. 8). In FIG. 6, only an extension line (dotted line) and a reference numeral thereof are shown. These liquid crystal panels 925R, 925G, and 925B are cooled by cooling air from the third intake fan 17C that is located on the opposite side of the prism unit 910 with the prism mounting surface 903C of the head body 903 therebetween corresponding to an air inlet 230. In this case, electric power for the third intake fan 17C is supplied from the power-supply circuit substrate 13 via the driver boards 11. Further, the base end of the projection lens 6 is similarly fixed to the front face of the head body 903 by fixing screws. The head body 903 thus having mounted thereon the prism unit 910, the optical modulation device 925, and the projection lens 6 is fixed to the lower light guide 902 by fixing screws, as shown in FIG. 5.

The driver boards 11 are intended for driving and controlling the above-described liquid crystal panels 925R, 925G, and 925B in the optical modulation device 925, and are arranged above the optical unit 10. In addition, a lower driver board 11A and an upper driver board 11B are separated from each other via a stud bolt 9011, and many non-illustrated elements forming a driving circuit, or the like are mounted on their opposing surfaces thereof. That is, the elements are efficiently cooled by cooling air flowing between the respective driver boards 11. Such cooling air is mainly drawn in by the above-described third intake fan 17C, cools the respective liquid crystal panels 925R, 925G, and 925B, and then flows between the respective driver boards 11 through an opening 904 (shown by a double-dot chain line in FIG. 3) of the upper light guide 901.

The main board 12 has formed thereon a control circuit for controlling the entire projection display device 1, and stands on the side of the optical unit 10. Such a main board 12 is electrically connected to an interface substrate 14 having formed thereon the input-output terminals 59 and to a video substrate 15, in addition to the above-described driver boards 11, the control switches 60, and is connected to the power-supply circuit substrate 13 via a connector or the like. The control circuit of the main board 12 is driven by electric power produced by the power-supply circuit on the power-supply circuit substrate 13, that is, electric power from the second power-supply block 7B. Incidentally, the main board 12 is cooled by cooling air flowing from the second intake fan 17B and passes through the second power-supply block 7B.

In FIG. 3, a guard member 19 made of metal, such as aluminum, is arranged between the main board 12 and the outer casing 2 (only the lower casing 4 and the rear casing 5 are shown in FIG. 3). The guard member 19 includes a large planar section 191 spreading between the top and bottom ends of the main board 12, and is fixed at the upper side to the cover member 250B of the second power-supply block 7B by a fixing screw 192, and is engaged with and supported by, for example, a slit in the lower casing 4 at the bottom. Consequently, interference between the upper casing 3 (FIG. 1) and the main board 12 is prevented when the upper casing 3 is mounted to the lower casing 4, and the main board 12 is protected from external noises.

Figure 7:
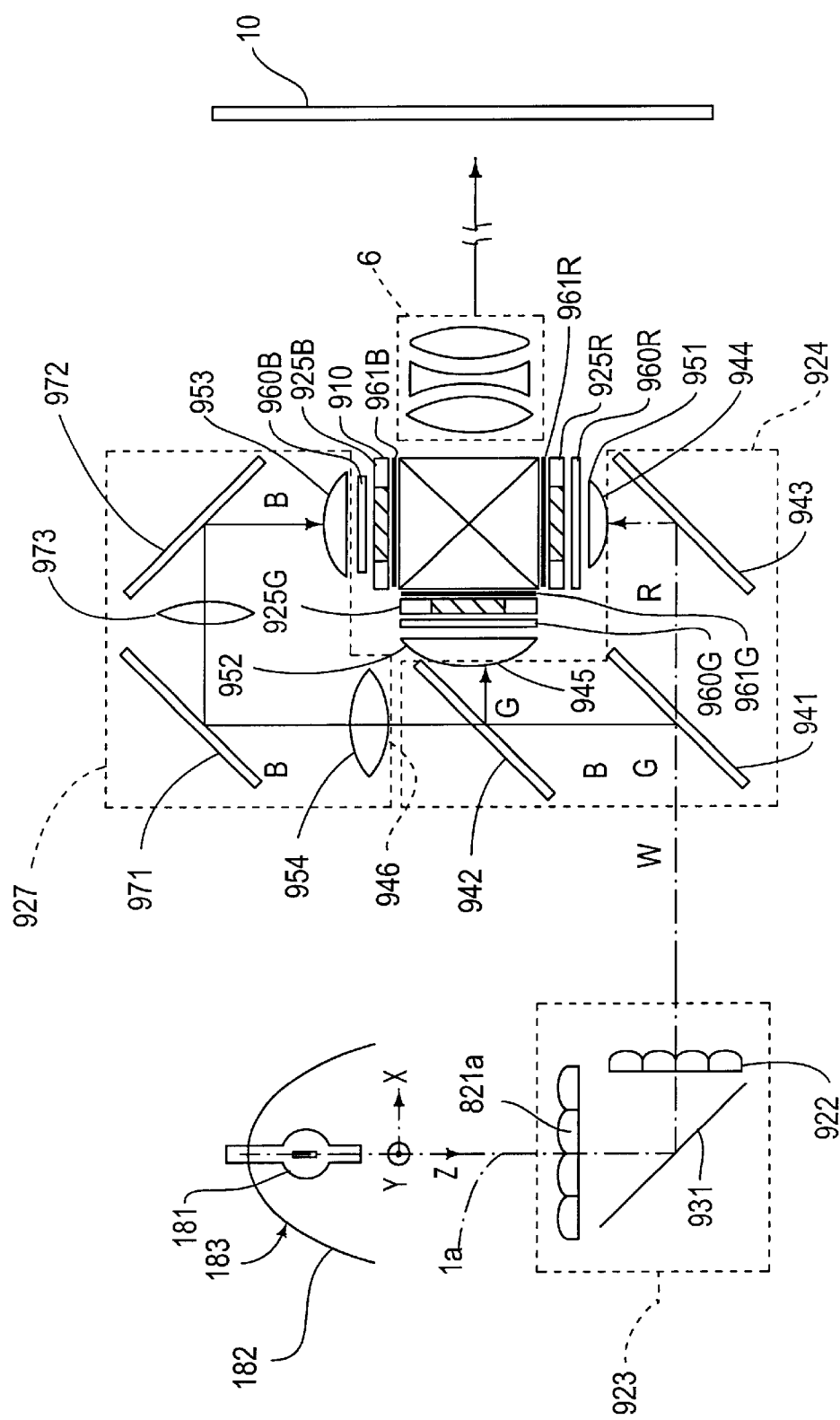
FIG. 7 is a schematic view illustrating the structure of the optical system in the projection display device of the embodiment.

Next, the structure of the optical system, namely, the optical unit 10 of the projection display device 1 will now be described with reference to a schematic view shown in FIG. 7.

As described above, the optical unit 10 includes the illuminating optical system 923 for uniforming the in-plane illuminance distribution of the light (W) from the light source lamp unit 8, the color separation optical system 924 for separating the light (W) from the illuminating optical system 923 into red (R), green (G), and blue (B), liquid crystal panels 925R, 925G, and 925B for modulating the color light R, G, and B according to image information, and the prism unit 910 serving as the color synthesizing optical system for synthesizing the modulated color light.

The illuminating optical system 923 includes a reflecting mirror 931 for bending an optical axis 1a of light W emitted from the light source lamp unit 8 toward the front of the device, and a first lens plate 921 and a second lens plate 922 arranged on both sides of the reflecting mirror 931.

The first lens plate 921 includes a plurality of rectangular lenses arranged in the form of a matrix, separates the light emitted from the light source into a plurality of partial light, and collects the partial light near the second lens plate 922.

The second lens plate 922 includes a plurality of rectangular lenses arranged in a matrix, and has the function of superimposing partial light emitted from the first lens plate 921 onto the liquid crystal panels 925R, 925G, and 925B (to be described later) for constituting the optical modulation device 925.

In this way, since the liquid crystal panels 925R, 925G, and 925B can be illuminated with light having a substantially uniform illuminance by the illuminating optical system 923 in the projection display device 1 of this embodiment, a projected image having little illuminance variations can be obtained.

The color separation optical system 924 is composed of a blue-green reflecting dichroic mirror 941, a green reflecting dichroic mirror 942, and a reflecting mirror 943. First, the blue light B and the green light G contained in the light W emitted from the illuminating optical system 923 are perpendicularly reflected by the blue-green reflecting dichroic mirror 941, and travel toward the green reflecting dichroic mirror 942.

The red light R passes through the blue-green reflecting dichroic mirror 941, is perpendicularly reflected by the reflecting mirror 943 located at the rear thereof, and is emitted from a light-emitting section 944 for the red light R toward the prism unit 910. Next, only the green light G of the blue and green light B and G reflected by the blue-green reflecting dichroic mirror 941 is perpendicularly reflected by the green reflecting dichroic mirror 942, and is emitted from a light-emitting section 945 for the green light G toward the prism unit 910. The blue light B passed through the green reflecting dichroic mirror 942 is emitted from a light-emitting section 946 for the blue light B toward the light guide system 927. In this embodiment, all the distances between the light-emitting section for the light W of the illuminating optical system 923 and the light-emitting sections 944, 945, and 946 for the color light R, G, and B of the color separation optical system 924 are set to be equal.

Light-collecting lenses 951 and 952 are arranged on the light-emitting sides of the light-emitting sections 944 and 945 for the red and green light R and G in the color separation optical system 924, respectively. Accordingly, the red and green light R and G emitted from the respective light-emitting sections enter the light-collecting lenses 951 and 952, where they are collimated.

The red and green light R and G thus collimated pass through the incident-side polarizers 960R and 960G, and enter the liquid crystal panels 925R and 925G, where they are modulated and given corresponding image information. That is, these liquid crystal panels 925R and 925G are subjected to switching control according to image information by the driver boards 11, whereby the color light passed therethrough is modulated. On the other hand, the blue light B is guided to the corresponding liquid crystal panel 925B via the light guide system 927, where it is similarly modulated according to image information. As the liquid crystal panels 925R, 925G, and 925B of this embodiment, for example, liquid crystal panels may be adopted that use a polysilicon TFT as a switching element.

The light guide system 927 is composed of a light-collecting lens 954 arranged on the light-emitting side of the light-emitting section 946 for the blue light B, an incident-side reflecting mirror 971, an emitting-side reflecting mirror 972, an intermediate lens 973 arranged between these reflecting mirrors, and a light-collecting lens 953 arranged before the liquid crystal panel 925B. The blue light B emitted from the light-collecting lens 953 passes through an incident-side polarizer 960B to enter the liquid crystal panel 925B, where it is modulated. In this case, the optical axis $1a$ of the light W, and optical axes $1r$, $1g$, and $1b$ of the color light R, G, and B are formed in the same plane. The blue light B of the color light has the longest optical path length, that is, the distance between the light source lamp 181 and the liquid crystal panel for the blue light B is the longest, and therefore, the amount of light of the blue light B to be lost is the largest. The light loss can, however, be restricted by interposing the light guide system 927 therebetween.

Next, the color light R, G, and B modulated through the liquid crystal panels 925R, 925G, and 925B pass through the emitting-side polarizers 961R, 961G, and 961B to enter the prism unit 910, where they are synthesized. That is, the prism unit 910 includes a cross-dichroic prism having therein two types of wavelength selective films arranged substantially in the shape of an X, and the color light R, G, and B are synthesized because of selecting characteristics of the two types of wavelength selective films. A color image synthesized by the prism unit 910 is enlarged and projected via the projection lens 6 onto the projection plane 100 located at a predetermined position.

Next, a description will be given of cooling flow paths formed in the projection display device 1.

In the projection display device 1, as is schematically shown by the arrows in FIGS. 1 and 2, there are mainly formed a first power-supply block cooling flow path 41, a second power-supply block cooling flow path 42, an optical modulation device cooling flow path 43, and a light source cooling flow path 44. However, cooling air circulating the respective cooling flow paths 41 to 44 does not strictly the flow along the arrows in the drawings, and is drawn and exhausted substantially along the arrows through the spaces between the respective components.

The first power-supply block cooling flow path 41 is a path for cooling air that is drawn from an air inlet 171 by the first intake fan 17A (FIGS. 3 and 4). The cooling air cools the first power-supply block 7A, and then cools a lamp driving substrate 18 arranged at the rear thereof. In this case, the cooling air flows insides the resin cover 185 that is open at both front and rear ends, and the direction of the flow is thereby limited in one direction, whereby the amount of flow for cooling the lamp driving substrate 18 is reliably maintained. Thereafter, the cooling air flows into the accommodating section 9021 from an opening 9022 provided at the top thereof, a non-illustrated another opening or spaces, or the like, cools the light source lamp unit 8 (the light source lamp 181) arranged inside thereof, and is exhausted from the air outlet 160 by the exhaust fan 16.

The second power-supply block cooling flow path 42 is a path for cooling air that is drawn by the second intake fan 17B. The cooling air cools the second power-supply block 7B, and then cools the main board 12 arranged at the rear thereof, and further, flows into the accommodating section 9021 from an opening 9023 provided in the vicinity thereof, or the like, cools the light source lamp unit 8, and is exhausted from the air outlet 160 by the exhaust fan 16.

The optical modulation device cooling flow path 43 is a path for cooling air that is drawn by the third intake fan 17C shown in FIGS. 5 and 6. As mentioned above, the cooling air cools the liquid crystal panels 925R, 925G, and 925B, and then flows between the upper and lower driver boards 11A and 11B through the opening 904 of the upper light guide 901 provided directly above, and is directed rearward along the opposing surfaces of the driver boards 11A and 11B. That is, a part of the optical modulation device cooling path 43 is formed by the respective driver boards 11A and 11B, and the elements mounted on the opposing surfaces thereof, which face the optical modulation device cooling flow path 43 are thereby efficiently cooled. The cooling air flows into the accommodating section 9021 through another opening 9024 in addition to the openings 9022 and 9023 to cool the light source lamp unit 8, and is similarly exhausted from the air outlet 160.

The light source cooling flow path 44 is a path for cooling air drawn in from an air inlet 172 (FIG. 2) formed on the lower surface of the lower casing 4. The cooling air is drawn in by the exhaust fan 16, is drawn in from the air inlet 172, and then flows into the accommodating section 9021 from an opening or space provided in the lower surface thereof to cool the light source lamp unit 8, and is exhausted from the air outlet 160.

The cooling air through the above-described cooling flow paths 41 to 44 is exhausted from the air outlet 160 by the exhaust fans 16, but these exhaust fans 16 are controlled according to the temperature conditions of heated components. In other words, a temperature sensor 9025 covered with a shrink tube or the like is provided in the vicinity of the opening 9022 on the side of the light source lamp unit 8 that is apt to increase in temperature, and similar temperature sensors (not shown) are also provided in the vicinity of the second lens plate 922 (FIG. 7) provided below the opening 9023, and the first and second power-supply blocks 7A and 713 and the liquid crystal panels 925R, 925G, and 925B. Electrical signals from these temperature sensors 9025 located in the respective cooling paths 41 to 44 are, for example, output to the main board 12 via the power-supply circuit substrate 13 or the like. On the main board 12, the signals are electrically processed to detect the temperature of the heat generating components or the cooling air. Consequently, the main board 12 executes control so as to perform positive cooling by simultaneously driving the exhaust fans 16 when it is determined that the temperature is high, or to save electric power by driving only one exhaust fan 16 when it is determined that the temperature is low.

Figure 8A:
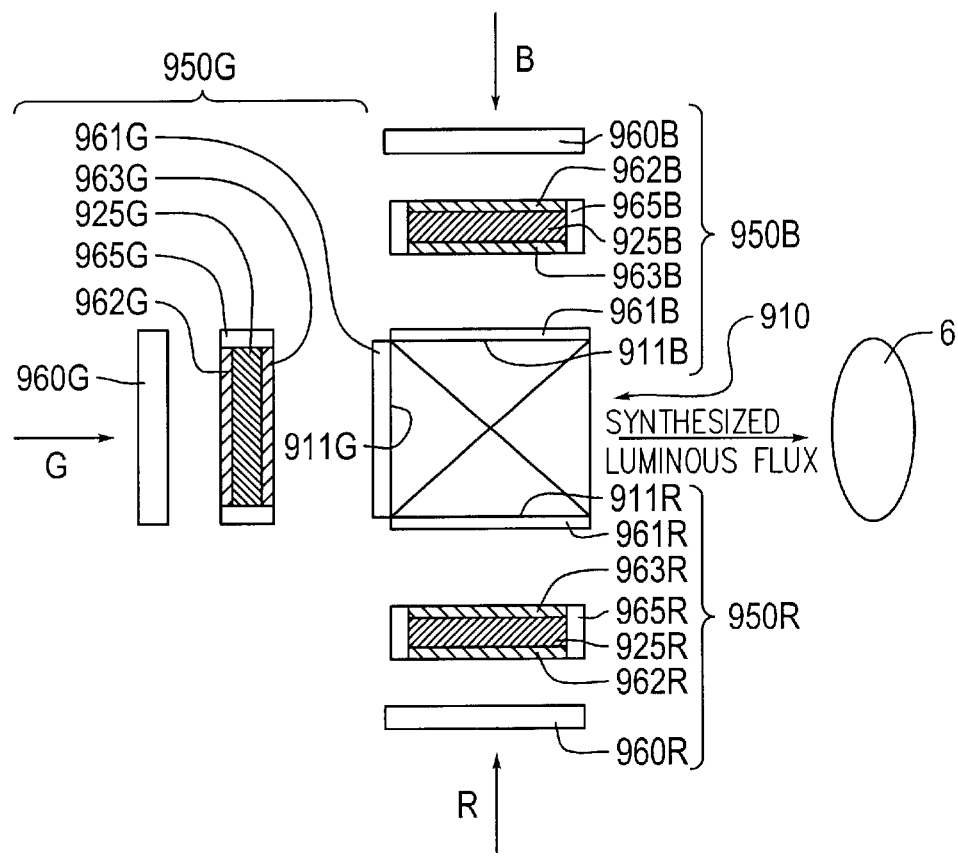
FIGS. 8(A)–(B) are enlarged views showing the periphery of the optical modulation device in the projection display device of the embodiment.
Figure 8B:
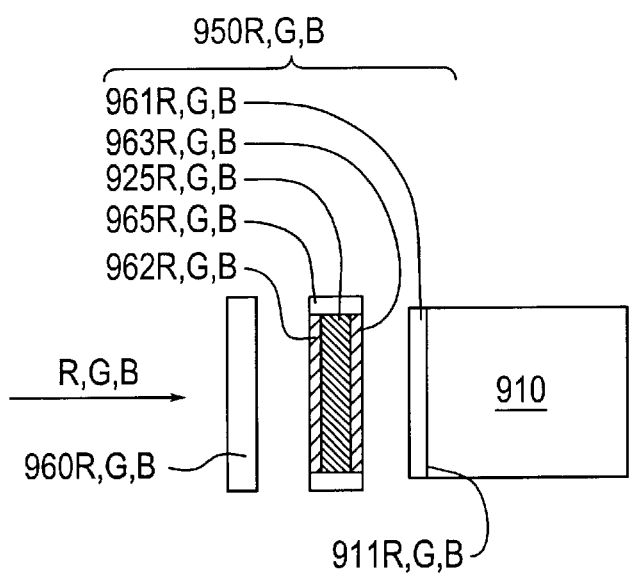

FIGS. 8(A)–(B) shows schematic configurations of the optical modulation devices 950R, 950G, and 950B.

As shown in the drawings, in the optical modulation devices 950R, 950G, and 950B in this embodiment, sapphire glasses 962R, 962G, 962B, 963R, 963G, and 963B are provided on the side of the light-incident surfaces and on the side of the light-emitting surfaces of the liquid crystal panels 925R, 925G, and 925B, respectively, which oppose the light-incident surfaces 911R, 911G, and 911B of the prism unit at a predetermined distance.

The sapphire glasses 962R, 962G, 962B, 963R, 963G, and 963B are affixed to both surfaces of the liquid crystal panels 925R, 925G, and 925B by bonding or the like. For this reason, dust does not enter between the sapphire glasses 962R, 962G, 962B, 963R, 963G, and 963B and the liquid crystal panels 925R, 925G, and 92513, whereby the color light can be prevented from scattering. If the thickness of the sapphire glasses is set to be larger than the focal depth of the projection lens 6, the dust can be made inconspicuous on the projection screen even when it adheres to the surfaces of the sapphire glasses.

The liquid crystal panels 925R, 925G, and 925B having affixed thereto the sapphire glasses 962R, 962G, 962B, 963R, 963G, and 963B are accommodated in frames 965R, 965G, and 965B. In addition, the periphery of the light-incident surfaces of the liquid crystal panels 925R, 925G, and 925B is coated with a metal thin-film 926, and the periphery on the side of the light-incident surfaces of the sapphire glasses 962R, 962G, and 962B is coated with a metal thin-film 964, respectively (FIG. 9).

Incident-side polarizers 960R, 960G, and 960B are arranged at a predetermined distance from the light-emitting surfaces of the sapphire glasses 962R, 962G, and 962B, and the emitting-side polarizers 961R, 961G, and 961B are bonded to the light-incident surfaces 911R, 911G, and 911B of the prism unit 910, respectively. In this way, by providing the incident-side polarizers 960R, 960G, and 960B and the emitting-side polarizers 961R, 961G, and 961B apart from the light-incident surfaces and the light-emitting surfaces of the liquid crystal panels 925R, 925G, and 925B, it is possible to prevent heat generated on the incident-side polarizers 960R, 960G, and 960B and the emitting-side polarizers 961R, 961G, and 961B from being transmitted to the liquid crystal panels 925R, 925G, and 925B.

Next, the frames 965R, 965G, and 965B for holding the liquid crystal panels 925R, 925G, and 925B having affixed thereto the sapphire glasses 962R, 962G, 962B, 963R, 963G, and 963B, and the structure for fixing the frames to the prism unit 910 will be described in detail with reference to FIGS. 9 to 12. Incidentally, since the respective frames 965R, 965G, and 965B have the same construction, only one frame 965R will be described on behalf thereof. In addition, in the following description, three directions perpendicular to one another are referred to as the X-axis direction (lateral direction), the Y-axis direction (vertical direction), and the Z-axis direction (direction parallel to the optical axis) for convenience.

Figure 9:
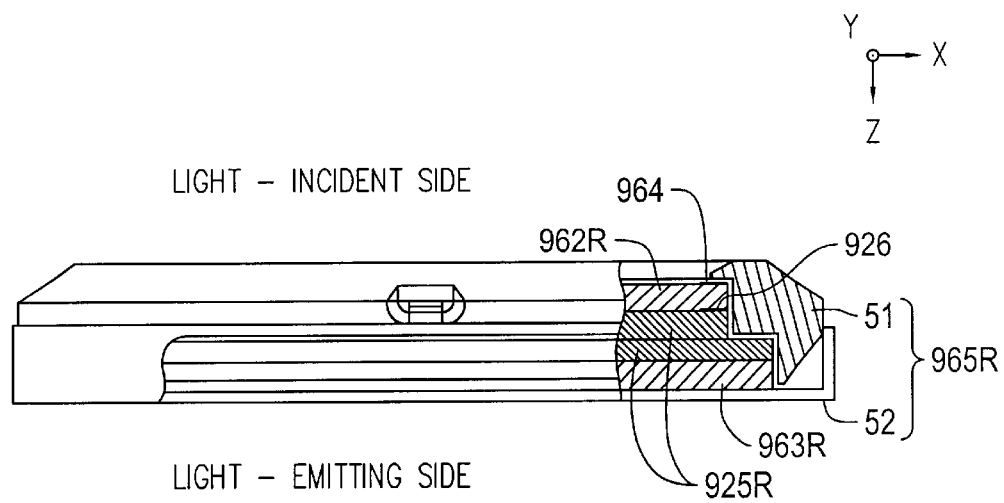
FIG. 9 illustrates a schematic sectional configuration of a frame of the optical modulation device in the projection display device of the embodiment.
Figure 10:
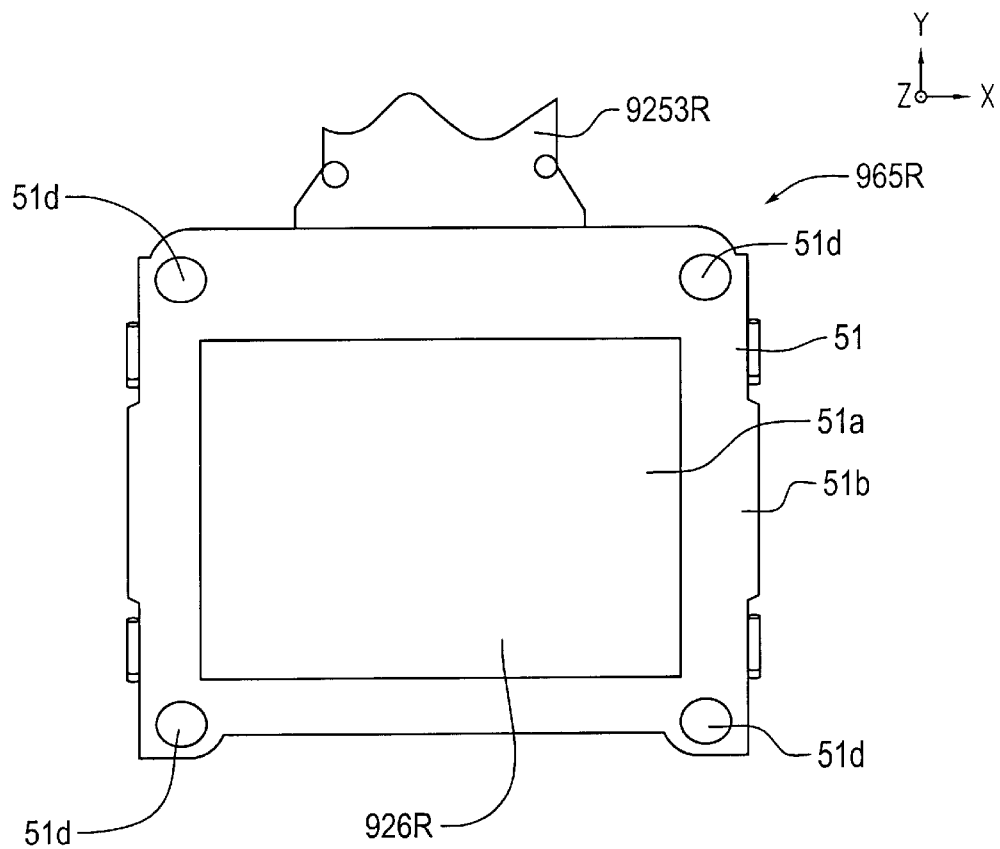
FIG. 10 illustrates a schematic plane configuration of the frame of the optical modulation device of the embodiment, as viewed from the light-incident side.

FIG. 9 shows a schematic sectional configuration of the frame 965R. In addition, FIG. 10 shows a schematic plane configuration of the frame 965R as viewed from the side of the light-incident surface, and FIG. 11 shows a schematic plane configuration as viewed from the side of the light-emitting surface.

The frame 965R includes a first frame member 51 for holding the liquid crystal panel 925R having affixed thereto the sapphire glasses 962R and 963R from the side of the light-incident surface, and a second frame member 52 for holding the same from the side of the light-emitting surface. The liquid crystal panel 925R having affixed thereto the sapphire glasses 962R and 963R is held between the first and second frame members 51 and 52.

The first frame member 51 is formed of a material including magnesium of good thermal conductivity as a principal material. In addition, the first frame member 51 includes a rectangular opening 51a for light transmission, and a peripheral wall 51b having a uniform thickness on the periphery thereof. Further, the first frame member 51 is provided in a state surrounding the side surfaces of the liquid crystal panel 925R and the sapphire glasses 962R and 963R.

The second frame member 52 is formed of a material having elasticity, such as stainless steel. In addition, the second frame member 52 includes a rectangular opening 52a for light transmission, and a peripheral wall 52b having a uniform thickness on the periphery thereof.

Engaging projections 51c are formed at respective left and right positions on the side surface of the first frame member 51. In contrast, the engaging holes 52c capable of fitting therein these engaging projections 51c are formed in the second frame member 52 at the positions corresponding to the respective engaging projections Sic. Therefore, if the second frame member 52 is pressed into the first frame member 51 from the outside of the sapphire glass 963R provided on the side of the light-emitting surface of the liquid crystal panel 925R in such a manner that the engaging projections 51c are inserted into the engaging holes 52c, the liquid crystal panel 925R having affixed thereto the sapphire glasses 962R and 963R is held by the frame 965R. Incidentally, a member extending upward from the frame 965R is a wiring flexible cable 9253R.

FIG. 12(A) shows a state in which the frame 965R is mounted to the light-incident surface 911R of the prism unit 910.

As shown in FIG. 12(A), the frame 965R holding the liquid crystal panel 925R having affixed thereto the sapphire glasses 962R and 963R is fixed to a fixed frame plate 54 that is bonded and fixed to the light-incident surface 911R of the prism unit 910 via an intermediate frame plate 55. Incidentally, as described previously, the polarizer 961R is fixed to the light-incident surface 911R of the prism unit 910.

The intermediate frame plate 55 is a rectangular frame formed of almost the same or a larger size of the first frame member 51 of the frame 965R, and includes a rectangular opening 55a for light transmission. The intermediate frame plate 55 has engaging projections 55d extending perpendicularly from the surface of the frame plate formed at four comers of an rectangular opening 55a. In contrast, the frame 965R has engaging holes 51d formed at the positions corresponding to the respective engaging projections 55d which can be inserted into the engaging holes 51d.

In this embodiment, an engaging hole 51d is formed in the first frame member 51 of the frame 965R. Therefore, if the frame 965R and the intermediate frame plate 55 are overlaid one to the other while aligning the engaging projections 55d of the intermediate frame plate 55 with the engaging holes 51d of the frame 965R, the engaging projections 55d are inserted in the engaging holes 51d, whereby a temporarily attached state is formed.

On the other hand, the fixed frame plate 54 is also a rectangular frame plate having formed therein a rectangular opening 54a for light transmission. In addition, the rectangular opening 54a formed in the fixed frame plate 54 is formed larger than the light-incident surface of the polarizer 961R. The fixed frame plate 54 is fixed to the light-incident surface 911R of the prism unit 910 with an adhesive. In this case, if a bonded surface 54e of the fixed frame plate 54 is completely covered with the polarizer 961R, bonding strength may decrease and the polarizer 961R may be separated. As shown in FIG. 12(B), however, if the bonded surface 54e of the fixed frame plate 54 is prevented from being completely covered with the polarizer 961R, possibility of a decrease in bonding strength and separation of the polarizer 961R can be extremely reduced.

The fixed frame plate 54 has screw holes 54c formed at both ends of its upper frame section, and at the widthwise center of its lower frame section. The intermediate frame plate 55 has also screw holes 55c corresponding to these three screw holes 54c. By inserting flat-head screws 56 for fastening use into the corresponding screw holes 54c and 55c, the intermediate frame plate 55 is fixed to the fixed frame plate 54. In this embodiment, the intermediate frame plate 55 is fixed to the fixed frame plate 54 by three screws 56. The number of screws is not limited and may be four or more, and two or less. In general, as the number of screws decreases, the number of steps of fastening the screws decreases, and manufacturing is facilitated.

Here, the fixed frame plate 54 has engaging projections 54b formed at the right and left corners of its lower frame section, and the intermediate frame plate 55 has engaging holes 55b formed at right and left corners of its lower frame section corresponding to these two engaging projections 54b. Therefore, in fixing by the screws 56, the intermediate frame plate 55 can be temporarily fixed to the fixed frame plate 54 by pressing the intermediate frame plate 55 toward the fixed frame plate 54 while aligning the engaging holes 55b of the intermediate frame plate 55 with the engaging projections 54b of the fixed frame plate 54. This makes it possible to further improve the positioning accuracy of both frame plates.

The projection display device 1 of this embodiment includes a positioning device for positioning the frame 965R to the intermediate frame plate 55 that is fixed to the fixed frame plate 54. This positioning device includes two wedges 57. Wedge guide surfaces 51e against which inclined surfaces 57a of the wedges 57 abut are formed on the vertical centers of the right and left side surfaces of the frame 965R. When the frame 965R is temporarily attached to the intermediate frame plate 55, wedge insertion grooves are formed between the wedge guide surfaces 51e and the frame sections of the intermediate frame plate 55 facing the wedge guide surfaces 51e.

Therefore, after the frame 965R has been temporarily attached to the intermediate frame plate 55, if the two wedges 57 are struck in the right and left sides of the frame 965R and the amount of the wedges 57 to be pressed in is adjusted, the position of the frame 965R is defined, and the liquid crystal panel 925R held by the frame 965R can be positioned.

Next, a description will be given of a procedure of attaching the frame 965R to the light-incident surface 911R of the prism unit 910. First, the frame 965R by which the liquid crystal panel 925R and sapphire glasses 962R and 963R are held is prepared. In addition, the prism unit 910 in which the polarizer 961R is fixed to the light-incident surface 911R is prepared. Next, the fixed frame plate 54 is positioned, bonded and fixed to the light-incident surface 911R of the prism unit 910. An ultraviolet-curing adhesive or the like may be used as an adhesive.

Then, the intermediate frame plate 55 is positioned on the surface of the fixed frame plate 54 that is bonded and fixed, and the intermediate frame plate 55 is secured by the three flat-head screws 56. Thereafter, the frame 965R by which the liquid crystal panel 925R and the like are held is positioned on the intermediate frame plate 55, and is temporarily attached thereto. That is, the engaging projection 55d of the intermediate frame plate 55 is aligned with the engaging hole 51d of the frame 965R, and the frame 965R is pressed into the intermediate frame plate 55 in this state. Incidentally, if the fixed frame plate 54 and the intermediate frame plate 55 are integrally formed in advance by the screws 56 before bonding and fixing the fixed frame plate 54 to the prism unit 910, the accuracy of position can be easily obtained.

Thereafter, the liquid crystal panel 925R is positioned to the light-incident surface 911R of the prism unit 910 using the wedges 57 as the positioning device. That is, the two wedges 57 are inserted between the frame 965R and the intermediate frame plate 55 that are temporarily attached, along the wedge guide surface 51e formed on the frame 965R. The alignment and focusing of the liquid crystal panel 925R are adjusted by controlling the amount of insertion of the respective wedges 57.

When the positioning is completed, these wedges 57 are bonded and fixed to the frame 965R and the intermediate frame plate 55 that are the members to be positioned using an adhesive. As the adhesive used in this case, an ultraviolet-curing adhesive can also be used.

According to this embodiment, the following advantages are provided.

1) The sapphire glasses 962R, 962G, 962B, 963G, 963B, and 963B affixed to the liquid crystal panels 925R, 925G, and 925B have extremely high thermal conductivity as shown in Table 1. Therefore, heat-dissipating properties of the liquid crystal panels 925R, 925G, and 925B are improved, and overheating can be prevented. Thus, of the optical members constituting the projection display device, the liquid crystal panels 925R, 925G, and 925B particularly having poor heat resistance are easily cooled, and reliability of the device is improved. In addition, since the liquid crystal panels 925R, 925G, and 925B can be easily cooled, it becomes possible to use the light source lamp unit 8 having higher luminance, and a projection display device of a bright image can be obtained. Further, since light from the light source lamp unit 8 can be collected on the liquid crystal panels 925R, 925G, and 925B having smaller areas, a reduction in size of the device can be facilitated.

2) The sapphire glasses 962R, 962G, 962B, 963G, 963B, and 963B are hard because of high Young's modulus, and are difficult to scratch. Therefore, yields of the optical modulation devices in which the sapphire glasses 962R, 962G, and 962B are affixed to the liquid crystal panels 925R, 925G, and 925B are improved, and the optical modulation devices become easy-to-handle, thereby facilitating their management. In addition, deterioration in image quality due to projection of scratch on the projected image can be prevented.

3) Further, by increasing the thickness of the sapphire glasses 963R, 963G, and 963B to larger than the focal depth of the projection lens 6, the dust attached to the surface thereof can be made inconspicuous on the projection screen. Here, as shown in Table 1, the sapphire glass has a high refractive index. Therefore, in the case where the sapphire glasses 963R, 963G, and 963B are used for such a purpose, sapphire glasses thinner than other glasses can be used.

Thus, heat from the liquid crystal panels 925R, 925G, and 925B is discharged to the outside very efficiently as compared with other glasses, so that the liquid crystal panels 925R, 925G, and 925B are cooled more easily.

4) Still further, the above-described liquid crystal panels 925R, 925G, and 925B have pixels formed in a matrix, and the periphery of the pixels light-shielded (not shown). Thus, in order to improve use efficiency of light by collecting incident light on a portion (opening) where the pixels are not light-shielded so that the incident light is not shielded by a light-shielding section, micro lens arrays may be provided on the light-incident surfaces of the liquid crystal panels 925R, 925G, and 925B. In the projection display device of this embodiment, since the sapphire glasses 962R, 962G, and 962B are affixed to the light-incident surfaces of the liquid crystal panels 925R, 925G, and 925B, they can be used as the micro lens arrays. Since the sapphire glass has an extremely high refractive index, as shown in Table 1, a sufficient light-collecting power can be obtained even without reducing a radius of curvature of the micro lens. Therefore, the micro lens can be accurately formed, thereby making it possible to achieve more effective improvement in the use efficiency of light. Further, even if light having a large angle of incidence is incident on the sapphire glasses 962R, 962G, and 962B having formed thereon the micro lens arrays, the incident light can be corrected to the light having a smaller angle of incidence. Therefore, the amount of light taken by the projection lens 6 can be increased, thereby making it possible to obtain a bright projection image.

5) According to this embodiment, the sapphire glasses 962R, 962G, and 962B are affixed to the light-incident-side surfaces of the liquid crystal panels 925R, 925G, and 925B. In the case of the projection display device using a cross-dichroic prism as in this embodiment, the light-incident side of the liquid crystal panels 925R, 925G, and 925B has more spaces and provides higher heat-dissipating effect than the light-emitting side. Thus, overheating of the liquid crystal panels 925R, 925G, and 925B can be prevented more efficiently, and reliability of the device is further improved.

6) In this embodiment, the metal thin-film 926 is interposed between the sapphire glasses 962R, 962G, and 962B and the liquid crystal panels 925R, 925G, and 925B. Heat is transmitted to the sapphire glasses 962R, 962G, and 962B via the metal thin-film 926. In addition, the metal thin-film 964 is provided on contact portions between the frames 965R, 965G, and 965B and the sapphire glasses 962R, 962G, and 962B. Heat is transmitted to the frames 965R, 965G, and 965B via the metal thin-film. Therefore, heat-dissipating properties are improved, and the overheating of the liquid crystal panels 925R, 925G, and 925B can be prevented more efficiently. It is also possible to provide such a metal thin-film between the liquid crystal panels 925R, 925G, and 925B and the sapphire glasses 963R, 963G, and 963B, or between the frames 965k, 965G, and 965B and the sapphire glasses 963R, 963G, and 963B.

7) In this embodiment, the first frame member 51 constituting the frame 965R is formed of a material including magnesium of high thermal conductivity as a principal material. Therefore, heat dissipation from the frame 965R, 965G, and 965B becomes better, and overheating of the liquid crystal panels 925R, 925G, and 925B can be prevented more efficiently.

8) In this embodiment, the polarizers 960R, 960G, 960B, 961R, 961G, and 961B are arranged at the positions apart from the liquid crystal panels 925R, 925G, and 925B. Therefore, heat generated on the polarizers 960R, 960G, 960B, 961R, 961G, and 961B can be prevented from being transmitted toward the liquid crystal panels 925R, 925G, and 925B. It is not necessary to provide both the polarizers 960R, 960G, and 960B provided on the light-incident side of the liquid crystal panels 925R, 925G, and 92513 and the polarizers 961R, 961G, and 961B provided on the light-emitting side at the positions apart from the liquid crystal panels 925R, 925G, and 925B. In particular, the emitting-side polarizers 961R, 961G, and 961B that generate relatively little heat may be affixed to the light-emitting-side surfaces of the sapphire glasses 963R, 963G, and 963B. However, it is preferable in terms of the cooling efficiency that both the polarizers are provided at the positions apart from the liquid crystal panels 925k, 925G, and 925B.

Figure 13:
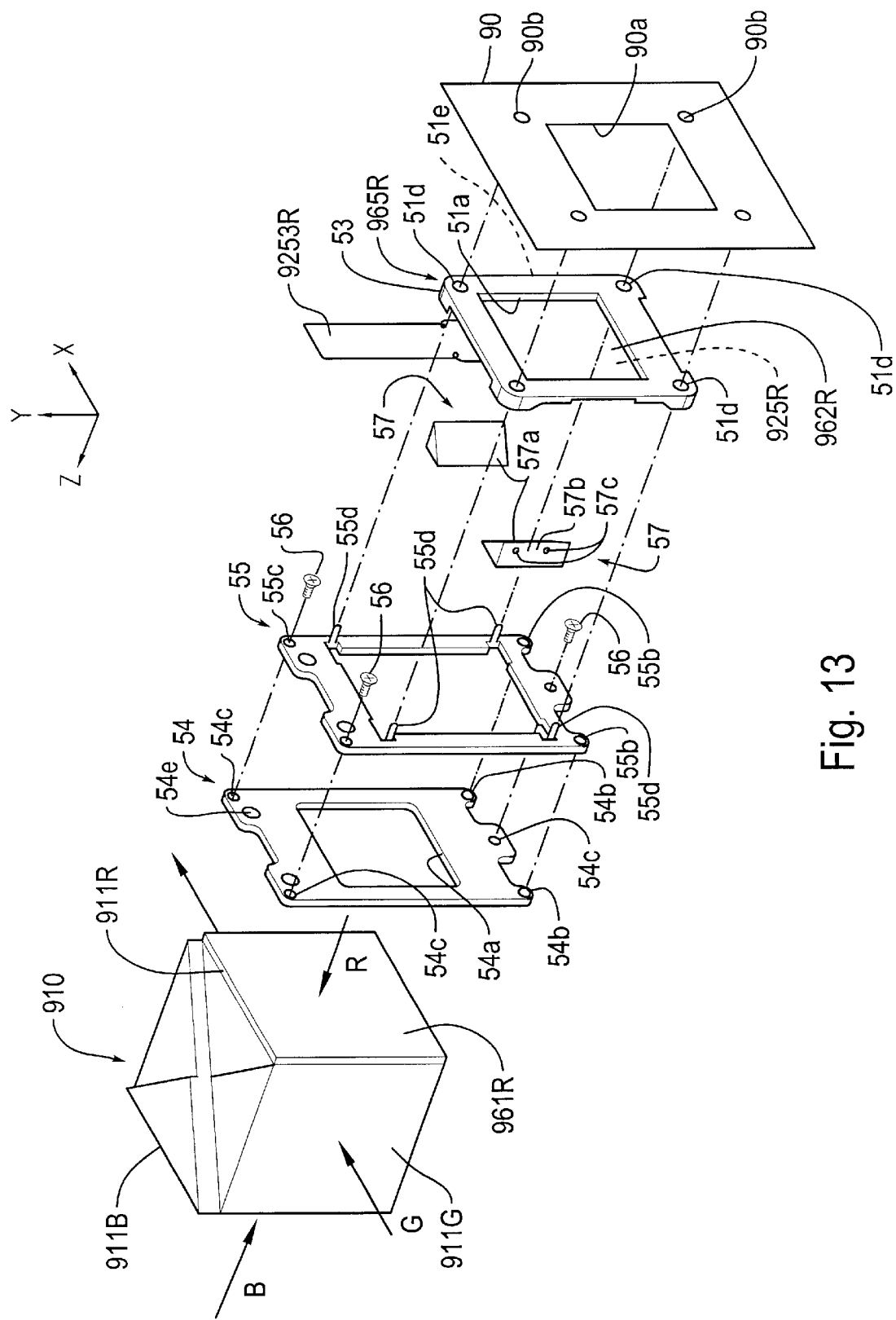
FIG. 13 is an exploded perspective view showing a state in which a frame of an optical modulation device according to a second embodiment of the present invention is mounted to a light-incident surface of a light-synthesizing prism.

The second embodiment of the present invention will be described with reference to FIG. 13. This embodiment is different from the above-described first embodiment in that graphite sheets 90 are affixed by an adhesive and fixed to the surfaces of the frames 965R, 965G, and 965B that hold the liquid crystal panels 925R, 925G, and 925B having affixed thereto the sapphire glasses 962R, 962G, 962B, 963R, 963G, and 953B in the optical modulation devices 950R, 950G, and 950B. Other configurations are similar to those of the above-described first embodiment. In this embodiment, the structure and members similar to those of the first embodiment are indicated by the same reference numerals, and a detailed description thereof will be omitted or simplified. Further, in this embodiment, since the optical modulation devices 950R, 950G, and 950B have the same construction, only the optical modulation device 950R will be described on behalf thereof.

The graphite sheet 90 is formed in the shape of substantially a quadrangle having the outer-diameter size larger than the intermediate frame plate 55 and the fixed frame plate 54. The graphite sheet 90 has formed therein an opening 90a corresponding to the rectangular opening 51a of the frame 965R. In addition, four positioning holes 90b are formed outside the four corners of the opening 90a. These positioning holes 90b correspond to the engaging holes S1d of the frame 965R and the engaging projections 55d of the intermediate frame plate 55.

In this embodiment, advantages similar to those of the first embodiment can be also obtained. In addition, since the graphite sheet 90 is excellent in thermal conductivity, it provides an advantage such that the heat stored in the liquid crystal panels 925R, 925G, and 925B can be discharged through the graphite sheet 90, and overheating of the optical modulation device can be prevented.

Figure 14:
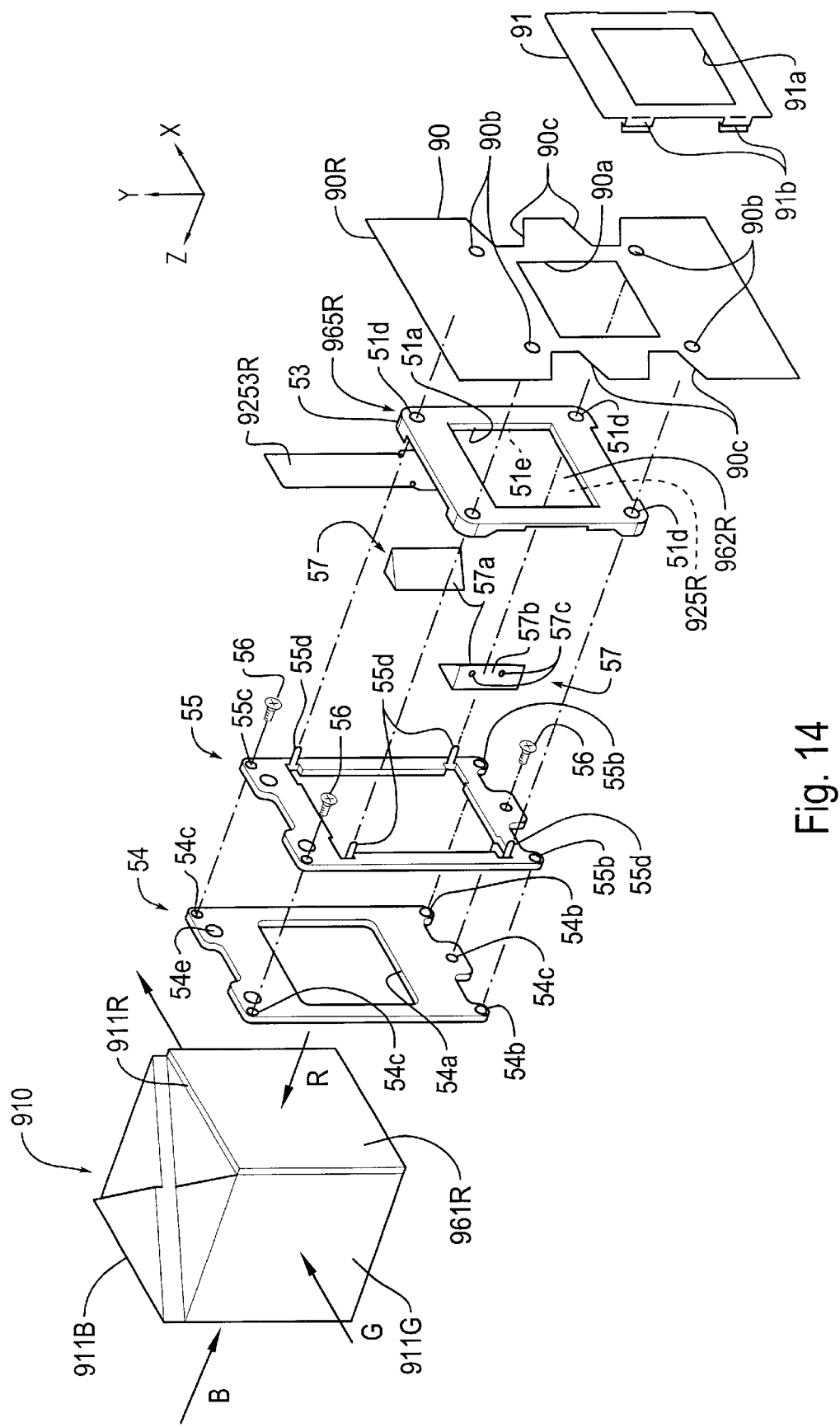
FIG. 14 is an exploded perspective view showing a state in which a frame of an optical modulation device according to a third embodiment of the present invention is mounted to a light-incident surface of a light-synthesizing prism.

The third embodiment of the present invention will be described with reference to FIG. 14. This embodiment is different from the above-described first embodiment in that graphite sheets 90A are pressed into contact with and fixed to the surfaces of the frames 965R, 965G, and 965B that hold the liquid crystal panels 925R, 925G, and 925B having affixed thereto the sapphire glasses 962R, 962G, 962B, 963R, 963G, and 963B by press-contact members 91 formed of elastic members. Other configurations are similar to those of the above-described first embodiment. In this embodiment, the structure and members similar to those of the embodiments are indicated by the same reference numerals, and a detailed description thereof will be omitted or simplified. Further, in this embodiment, since the optical modulation devices 950R, 950G, and 950B have the same construction, only one frame 965R will be described on behalf thereof.

While the graphite sheet 90A has substantially the similar size and shape to those of the graphite sheet 90 according to the above-described second embodiment, upper and lower recesses 90c are formed on both left and right side surfaces thereof. Upper and lower hooks 91b formed on both left and right side surfaces of the press-contact member 91 are inserted through the recesses 90c.

The press-contact member 91 is formed in the shape of a quadrangle having substantially the same size as the outer-diameter size of the frame 965R, and has hooks 91b formed on the left and right side surfaces, as described above. In addition, the press-contact member 91 has formed therein an opening 91a corresponding to the rectangular opening 51a of the frame 965R and the opening 90a of the graphite sheet 90. The left and right hooks 91b have projections at ends thereof projecting in a direction to face each other. The hooks 91b of the press-contact member 91 are inserted into the graphite sheet 90A mounted to the frame 965R and the projections thereof are engaged with the surface of the intermediate frame 53 of the frame 965R on the side of the prism unit 910, whereby the graphite sheet 90A is pressed into contact with and fixed to the frame 965R by the press-contact member 91.

In this embodiment, advantages similar to those of the first and second embodiments can be also obtained. In addition, since the graphite sheets 90A are pressed into contact with and fixed to the frames 965R, 965G, and 965B by the press-contact members 91, heat from the liquid crystal panels 925R, 925G, and 925B is transmitted more reliably to the graphite sheets 90A, thereby providing an effect of preventing overheating of the optical modulation device.

Figure 15:
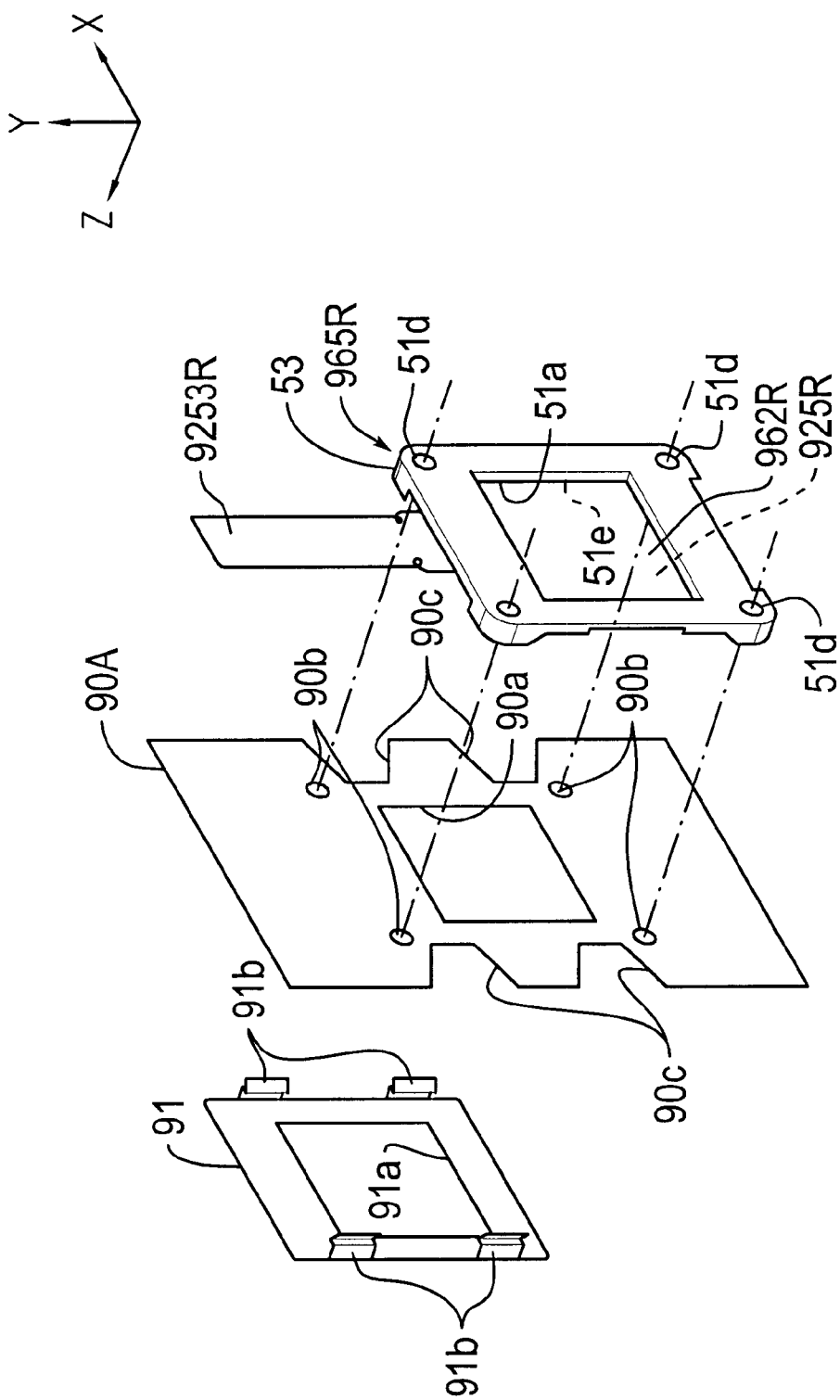
FIG. 15 is an exploded perspective view showing a state in which a graphite sheet and a press-contact member are mounted to a frame of an optical modulation device according to a fourth embodiment of the present invention.

In the fourth embodiment of the present invention shown in FIG. 15, the graphite sheet 90A and the press-contact member 91 that have been mounted on the incident side of the frame 965R in the third embodiment are mounted on the light-emitting side of the frame 965R. Other configurations are similar to those of the above-described third embodiment. In this embodiment, the structure and members similar to those of the above-described third embodiment are indicated by the same reference numerals, and a detailed description thereof will be omitted or simplified. Further, since the frames 965R, 965G, and 965B having mounted thereto the graphite sheets 90A have the same construction, only one frame 965R will be described on behalf thereof.

In this embodiment, advantages similar to those of the above-described third embodiment can be also obtained.

The fifth embodiment of the present invention will be described with reference to FIG. 16. This embodiment has substantially the same configuration as the above-described second embodiment, but is different from the second embodiment in that the graphite sheet 90 is connected to a duct 92 made of metal for constituting a flow path of cooling air. Other configurations are similar to those of the second embodiment. In this embodiment, the structure and members similar to those of the second embodiment are indicated by the same reference numerals, and a detailed description thereof will be omitted or simplified.

Figure 16:
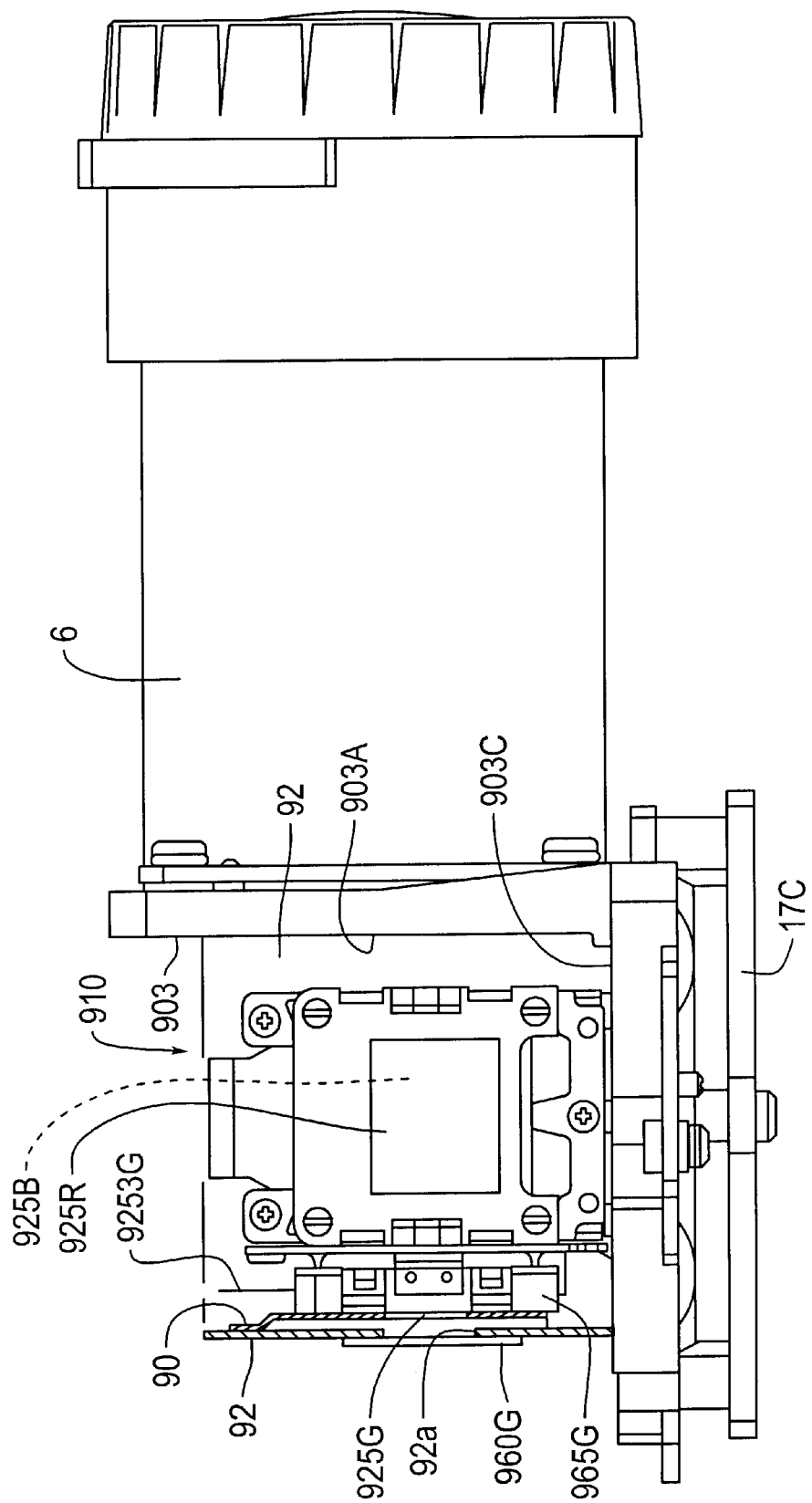
FIG. 16 is a longitudinal sectional view showing a state in which a graphite sheet is mounted to a duct near an optical modulation device according to a fifth embodiment of the present invention.

As shown in FIG. 16, a duct 92 for surrounding the prism unit 910 and the liquid crystal panels 925R, 925G, and 925B apart from a predetermined distance is mounted to the head body 903. The duct 92 forms a flow path for cooling air introduced from the fan 17C arranged below the head body 903. In addition, the duct 92 has formed therein a rectangular opening 92a corresponding to the openings 51a of the frame 965R, 965G, and 965B, and polarizers 960R, 960G, and 960B are attached thereto so as to cover the rectangular opening 92a. The graphite sheets 90 are affixed on the incident side of the frames 965R, 965G, and 965B that hold the liquid crystal panels 925R, 925G, and 925B having affixed thereto the sapphire glasses 962R, 962G, 962B, 963R, 963B, and 963B, and the upper ends thereof are bent to abut against the duct 92. While this state is shown only on frame 965G in FIG. 16, the other frames 965R and 965B have similar configurations.

In this embodiment, advantages similar to those of the above-described first and second embodiments can be also obtained. In addition, since the graphite sheets 90 are mounted to the frame 965R, 965G, and 965B and the upper ends thereof abut against the duct 92 made of metal, heat from the liquid crystal panels 925R, 925G, and 925B and the frames 965R, 965G, and 965B is transmitted to the duct 92 made of metal via the graphite sheets 90. Consequently, overheating of the liquid crystal panels 925R, 925G, and 925B can be prevented more efficiently.

Incidentally, in this embodiment, the graphite sheets 90 may be pressed into contact with and fixed to the frames 965R, 965G, and 965B as in the third embodiment, instead of being affixed.

In addition, a member for bringing the graphite sheet 90 into contact therewith is not limited to the duct 92 made of metal, and the graphite sheet 90 may be brought into contact with other metallic part. However, if the graphite sheet 90 is brought into contact with a metallic part that forms cooling paths as in this embodiment, it becomes possible to most effectively achieve an object of prevention of heating.

In addition, the graphite sheet 90 can be not only abutted against the duct 92 but also bonded thereto using an adhesive and pressed into contact therewith using other members.

The sixth embodiment of the present invention will be described with reference to FIG. 17. This embodiment is different from the above-described first embodiment in that fins 980 are provided on the frames 965R, 965G, and 965B that hold the liquid crystal panels 925R, 925G, and 925B having affixed thereto the sapphire glasses 962R, 962G, 962B, 963R, 963G, and 963B. Other configurations are similar to those of the above-described first embodiment. In this embodiment, the structure and members similar to those of the above-described first embodiment are indicated by the same reference numerals, and a detailed description thereof will be omitted or simplified. Further, in this embodiment, since the respective frames 965R, 965G, and 965B have the same construction, only one frame 965R will be described on behalf thereof.

Figure 17:
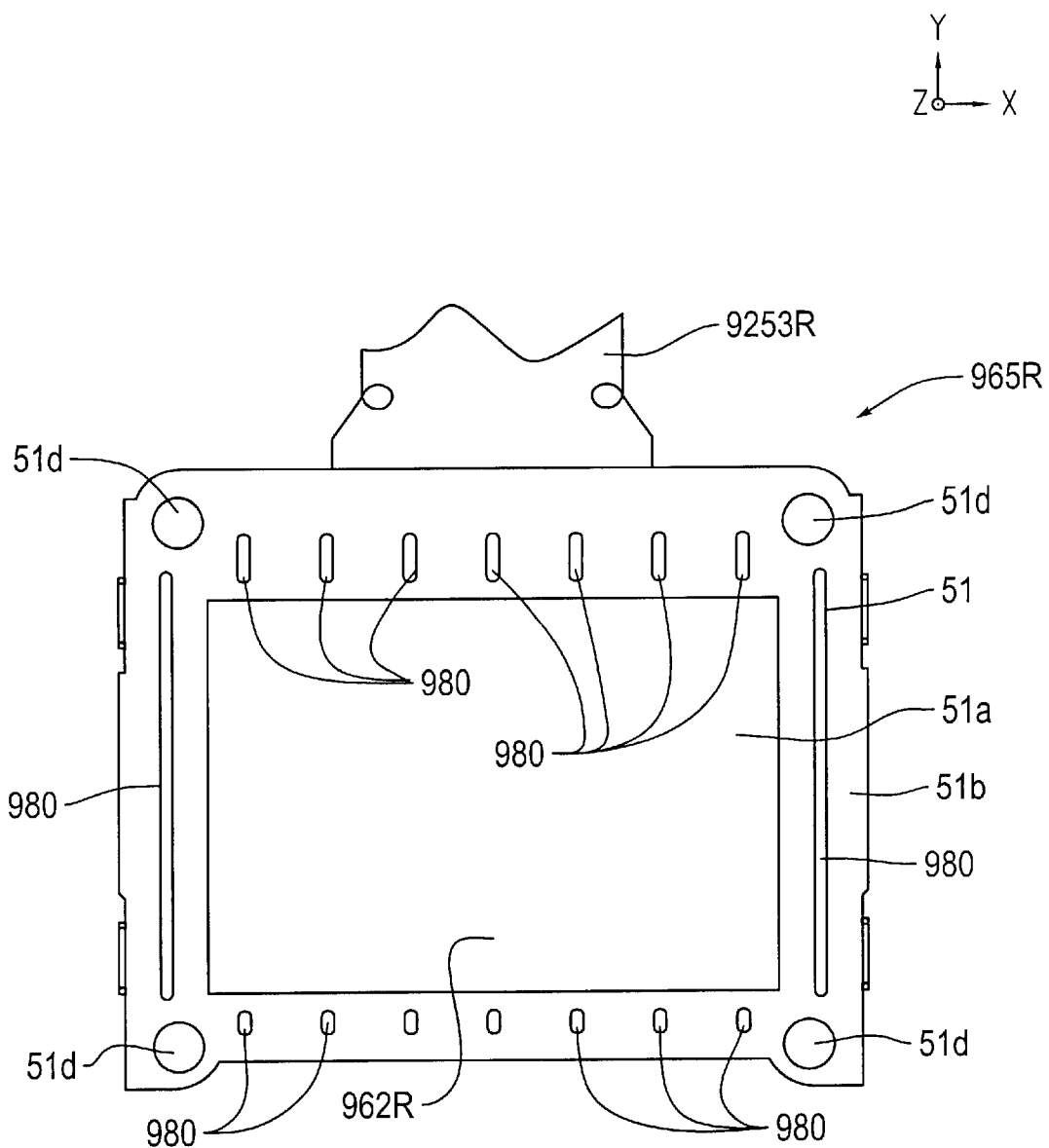
FIG. 17 shows a state in which fins are provided on a frame of an optical modulation device according to a sixth embodiment of the present invention, as viewed from the light-incident side.

As shown in FIG. 17, a plurality of fins 980 are formed on the side of the light-incident surface of the frame 965R in a longitudinal direction, in other words, along the flow paths for cooling air.

In this embodiment, advantages similar to those of the above-described first embodiment can be also obtained. In addition, since a plurality of fins 980 are formed on the frames 965R, 965G, and 965B along the flow of cooling air of the optical modulation device cooling flow path 43, surface areas of the frames 965R, 965G, and 965B increase, so that the heat-dissipating effect is improved and overheating of the optical modulation device can be further prevented. While the fins 980 are formed on the side of the light-incident surface of the frames 965R, 965G, and 965B in this embodiment, they may be formed on the side of the light-emitting surface. As described above, however, in the case of the projection display device using the cross-dichroic prism, the light-incident side of the liquid crystal panels 925R, 925G, and 925B has more spaces and higher heat-dissipating effect than the light-emitting side. Thus, the provision of the fins on the side of the light-incident surfaces of the frames 965R, 965G, and 965B in this embodiment can prevent heating of the liquid crystal panels 925R, 925G, and 925B more efficiently.

The present invention is not limited to the above-described embodiments, and includes the following modifications so long as they can achieve the object of the present invention.

That is, according to the embodiments described above, while all of the optical modulation devices 950R, 950G, and 950B for respectively modulating light of three colors of red, green, and blue have the same configuration, only the optical modulation device 950B that modulates blue light having the highest energy and the liquid crystal panel is easily deteriorated thereby may be configured like the optical modulation device in the above-described embodiments. In addition, the optical modulation device for modulating any two colors may be configured like the optical modulation device in the above-described embodiments. In this case, the optical modulation devices that modulate blue and green colors having relatively high energy may be configured like the optical modulation device in the above-described embodiments.

In addition, while the sapphire glasses 962R, 962G, 962B, 963R, 963G, and 963B are affixed to the light-incident side and the light-emitting side of the liquid crystal panels 925R, 925G, and 925B in the above-described embodiment, they may be affixed only to the light-incident side, or only to the light-emitting side.

In addition, in the above-described embodiments, the substrates of the liquid crystal panels 925R, 925G, and 925B may be made of sapphire glass instead of affixing the sapphire glasses 962R, 962G, 962B, 963R, 963G, and 963B to the liquid crystal panels 925R, 925G, and 925B. In this case, by setting the thickness of at least one substrate to not less than 1.5 mm, and not more than 3.0 mm, dust attached to the surface thereof can be made inconspicuous on the projection screen.

Further, while the emitting-side polarizers 961R, 961G, and 961B are affixed to the light-incident surfaces 911R, 911G, and 911B of the prism unit 910 in the above-described embodiments, they may be certainly bonded to the sapphire glasses 963R, 963G, and 963B. In this case, the dust can be prevented from entering between the liquid crystal panels 925R, 925G, and 925B and the polarizers 961R, 961G, and 961B, and polarization of light is not disturbed by dust. In addition, when a black image is displayed, a spot on the black image corresponding to the attached dust can be prevented from being displayed as a white blank, and display quality can be improved. In addition, the emitting-side polarizers 961R, 961G, and 961B may be independently arranged between the sapphire glasses 962R, 962G, and 962B and the prism unit 910.

The polarizers are divided into two types, a light-reflective polarizer and a light-absorptive polarizer. The light-reflective polarizer is of a type that passes one of two linear polarized light beams therethrough and reflects the other linear polarized light beam. In addition, the light-absorptive polarizer is of a type that passes one of two linear polarized light beams therethrough and absorbs the other linear polarized light beam. The polarizers 960R, 960G, 960B, 961R, 961G, and 961B of the embodiments may be either of the types. However, since the light-absorptive polarizer generally has better polarization selective characteristics, the light-absorptive polarizer may be preferably used in order to improve contrast. On the other hand, since the light-reflective polarizer generates little heat associated with polarization selection, the light-reflective polarizers may be preferably used at least for the incident-side polarizers 960R, 960G, and 960B when the cooling efficiency is regarded as important. Further, when both the improvement in contrast and the cooling efficiency are regarded as important, polarizers having stacked thereon the light-reflective polarizer and the light-absorptive polarizer may be preferably used as the polarizers 960R, 960G, and 960B.

Still further, in the above-described embodiments, so-called transmissive liquid crystal panels 925R, 925G, and 925R that modulates incident light and emits it from a light-emitting surface different from the light-incident surface are used as the optical modulation devices 950R, 950G, and 950B. However, the present invention is not limited thereto, and can be applied to an optical modulation device using a so-called reflective liquid crystal panel that reflects and modulates incident light by a plane different from the light-incident surface and emits it from the incident surface again, and to a projection display device using the same.

In addition, the electro-optical device is not limited to the liquid crystal panel described in the embodiments, and various devices having the function of optical modulation, such as a PLZT and a micro mirror device for modulating by changing an angle of reflection of light with a micro mirror, may be adopted thereto.

Finally, as the projection display devices, there are a front projection-type display device that performs projection in a direction that an observer observes an object, and a rear reflective-type projection display device that performs projection in the direction opposite to the direction that the observer observes the object. The present invention is applicable to either of the types.

As described above, according to the present invention, since the thermal conductivity of the sapphire glass is high, the heat-dissipating property is improved, an increase in luminance of an image to be formed and a reduction in size of the device can be facilitated, and overheating of the optical modulation device can be prevented.

In addition, since the refractive index is high, the amount of light taken by the projection lens can be increased when the sapphire glass is used as a micro lens. Therefore, it is possible to obtain a bright projection image.

Further, since the sapphire glass is affixed to the electro-optical device, dust can be prevented from adhering to the electro-optical device. In addition, since the sapphire glass is hard because of high Young's modulus, and is difficult to scratch, its yield thereof is improved, and it becomes easy-to-handle, thereby facilitating its management.

What is claimed is:

1. An optical modulation device comprising:

an electro-optical device having a light-incident side and a light-emitting side that modulates light emitted from a light source according to image information;

a sapphire glass affixed to at least one surface of the light-incident side and the light-emitting side of said electro-optical device; and a projection lens having a focal depth, said sapphire glass thickness being larger than the focal depth of said projection lens.

2. The optical modulation device according to claim 1, said sapphire glass being affixed to a surface of the light-incident side of said electro-optical device.

3. The optical modulation device according to claim 1, further comprising:

a frame that holds said electro-optical device; and a metal film provided on a contact portion between the frame and said sapphire glass.

4. The optical modulation device according to claim 3, said frame comprising two frames that hold said electro-optical device from a side of a light-incident surface and a side of a light-emitting surface, and at least one of said frames being formed of a material including magnesium as a principal material.

5. The optical modulation device according to claim 3, further comprising heat-dissipating fins provided on said frame.

6. The optical modulation device according to claim 5, said fins being provided along a flow of cooling air for cooling said electro-optical device and a vicinity of said electro-optical device.

7. The optical modulation device according to claim 3, further comprising a graphite sheet provided on said frame that transmits heat from said frame to another part.

8. The optical modulation device according to claim 7, said graphite sheet is being in contact with a metallic part.

9. The optical modulation device according to claim 1, further comprising polarizers arranged on the light-incident side and the light-emitting side of said electro-optical device, at least one of the polarizers being arranged at a position apart from one of said electro-optical device and said sapphire glass.

10. A projection display device comprising:

three optical modulation devices that respectively modulate red light, green light, and blue light according to image information, each of said optical modulation devices having an electro-optical device which includes a light-incident side and a light-emitting side;

a sapphire glass affixed to at least one surface of the light-incident side and the light-emitting side of said electro-optical device in said optical modulation device for modulating at least the blue light; and a projection lens having a focal depth, said sapphire glass having a thickness larger than the focal depth of said projection lens.

11. The projection display device according to claim 10, said sapphire glass being affixed to a surface of the light-incident side of said electro-optical device.

12. The projection display device according to claim 10, said optical modulation devices comprising a frame that holds said electro-optical device, and a metal film provided on a contact portion between the frame and said sapphire glass.

13. The projection display device according to claim 12, said frame comprising two frames that hold said electro-optical device from a side of a light-incident surface and a side of a light-emitting surface, at least one of said frames being formed of a material including magnesium as a principal material.

14. The projection display device according to claim 12, further comprising heat-dissipating fins provided on said frame.

15. The projection display device according to claim 14, said fins being provided along a flow of cooling air for cooling said electro-optical device and a vicinity of said electro-optical device.

16. The projection display device according to claim 12, further comprising a graphite sheet provided on said frame that transmits heat from said frame to another part.

17. The projection display device according to claim 16, said graphite sheet being in contact with a metallic part.

18. The projection display device according to claim 10, further comprising polarizers arranged on the light-incident side and the light-emitting side of said electro-optical device, at least one of the polarizers being arranged at a position apart from one of said electro-optical device and said sapphire glass.

19. An optical modulation device, comprising:

an electro-optical device that modulates light emitted from a light source according to image information, said electro-optical device having a pair of substrates, at least one of said substrates being made of sapphire glass having a thickness; and a projection lens having a focal depth, said sapphire glass having a thickness larger than the focal depth of said projection lens.

20. The optical modulation device according to claim 19, further comprising:

a frame that holds said electro-optical device; and a metal film provided on a contact portion between the frame and said sapphire glass.

21. The optical modulation device according to claim 20, said frame comprising two frames that hold said electro-optical device from a side of a light-incident surface and a side of a light-emitting surface, and at least one of said frames being formed of a material including magnesium as a principal material.

22. The optical modulation device according to claim 20, further comprising heat-dissipating fins provided on said frame.

23. The optical modulation device according to claim 22, said fins being provided along a flow of cooling air for cooling said electro-optical device and a vicinity of said electro-optical device.

24. The optical modulation device according to claim 20, further comprising a graphite sheet provided on said frame that transmits heat from said frame to another part.

25. The optical modulation device according to claim 24, said graphite sheet is being in contact with a metallic part.

26. The optical modulation device according to claim 19, further comprising polarizers arranged on the light-incident side and the light-emitting side of said electro-optical device, at least one of the polarizers being arranged at a position apart from one of said electro-optical device and said sapphire glass.

27. The optical modulation device according to claim 19, further comprising a projector lens having a focal depth and at least one of the substrates being made of sapphire glass having a thickness larger than the focal depth of said projection lens.

28. A projection display device, comprising:

three optical modulation devices that respectively modulate red light, green light, and blue light according to image information, each of said optical modulation devices having an electro-optical device, and said electro-optical device having a pair of substrates, at least one of said substrates of said electro-optical device in said optical modulation device that modulates at least the blue light being made of sapphire glass;

and a projection lens having a focal depth, said sapphire glass having a thickness larger than the focal depth of said projection lens.

29. The projection display device according to claim 28, said optical modulation devices comprising a frame that holds said electro-optical device, and a metal film provided on a contact portion between the frame and said sapphire glass.

30. The projection display device according to claim 29, said frame comprising two frames that hold said electro-optical device from a side of a light-incident surface and a side of a light-emitting surface, at least one of said frames being formed of a material including magnesium as a principal material.

31. The projection display device according to claim 29, further comprising heat-dissipating fins provided on said frame.

32. The projection display device according to claim 31, said fins being provided along a flow of cooling air for cooling said electro-optical device and a vicinity of said electro-optical device.

33. The projection display device according to claim 29, further comprising a graphite sheet provided on said frame that transmits heat from said frame to another part.

34. The projection display device according to claim 33, said graphite sheet being in contact with a metallic part.

35. The projection display device according to claim 28, further comprising polarizers arranged on the light-incident side and the light-emitting side of said electro-optical device, at least one of the polarizers being arranged at a position apart from one of said electro-optical device and said sapphire glass.

* * * * *